United States Patent
Sawasaki et al.

(10) Patent No.: US 7,012,658 B2
(45) Date of Patent: Mar. 14, 2006

(54) SUBSTRATE FOR LIQUID CRYSTAL DISPLAY AND LIQUID CRYSTAL DISPLAY UTILIZING THE SAME

(75) Inventors: Manabu Sawasaki, Kawasaki (JP); Tomonori Tanose, Kawasaki (JP); Katsunori Misaki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 93 days.

(21) Appl. No.: 10/767,226

(22) Filed: Jan. 28, 2004

(65) Prior Publication Data

US 2004/0246424 A1 Dec. 9, 2004

(30) Foreign Application Priority Data

Mar. 28, 2002 (JP) ............................. 2003-090834
Oct. 29, 2003 (JP) ............................. 2003-369354

(51) Int. Cl.
*G02F 1/136* (2006.01)

(52) U.S. Cl. ........................................ 349/43; 349/106
(58) Field of Classification Search ................ 349/43, 349/106
See application file for complete search history.

(56) References Cited

U.S. PATENT DOCUMENTS 6,825,907 B1 * 11/2004 Hashiguchi et al. ........ 349/139

2004/0238886 A1 * 12/2004 Lee et al. ................... 257/347

FOREIGN PATENT DOCUMENTS

| JP | 06-202153 | 7/1994 |
| JP | 10-039292 | 2/1998 |
| JP | 2000-098422 | 4/2000 |
| JP | 2001-142095 | 5/2001 |
| JP | 2002-277899 | 9/2002 |

* cited by examiner

*Primary Examiner*—Toan Ton
(74) *Attorney, Agent, or Firm*—Greer, Burns & Crain, Ltd

(57) ABSTRACT

The generation of residues or flakes of a color filter is suppressed to eliminate conduction failures on an LCD substrate having a color filter on an array substrate. A passivation film formed between a pixel electrode formed in each of a plurality of pixel regions and a TFT for driving the pixel electrode has a multi-layer structure constituted by SiN layers and a SiO layers, and the SiO layer is located at the top of the film. A resin CF layer is formed on the passivation film having such a multi-layer structure. Since the resin CF layer is formed directly on the SiO layer, reduction of the adhesion of the same is suppressed. As a result, the color filter is unlikely to come off when the resin CF layer is formed, and residues of the color filter is unlikely to be generated when a contact hole is formed in the resin CF layer. This suppresses conduction failures and makes it possible to provide a reliable TFT substrate and LCD having high display characteristics.

7 Claims, 24 Drawing Sheets

FIG.19A        FIG.19B
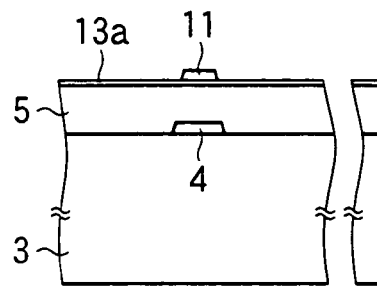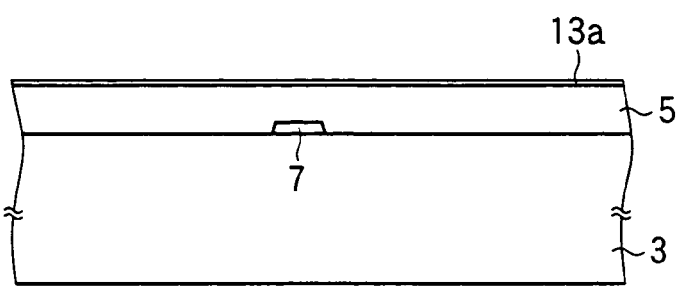
FIG.20A        FIG.20B
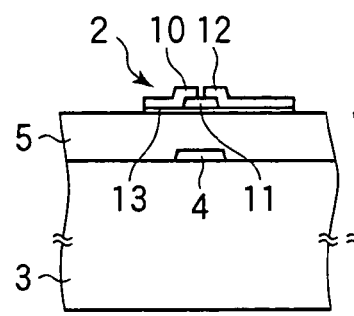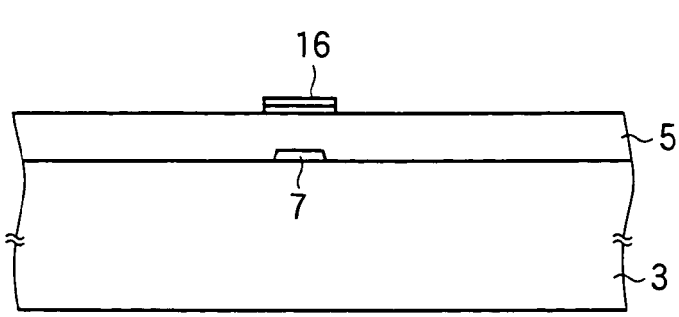

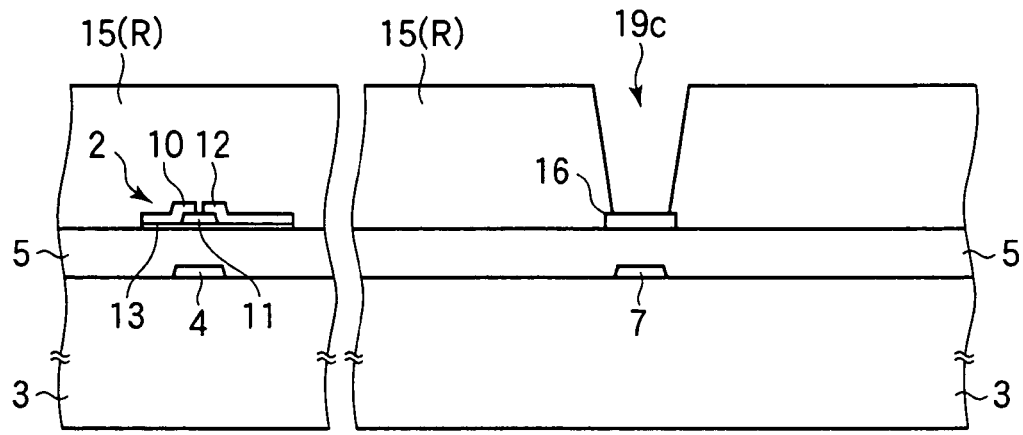
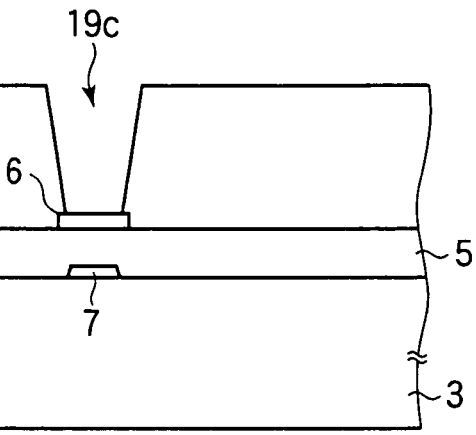
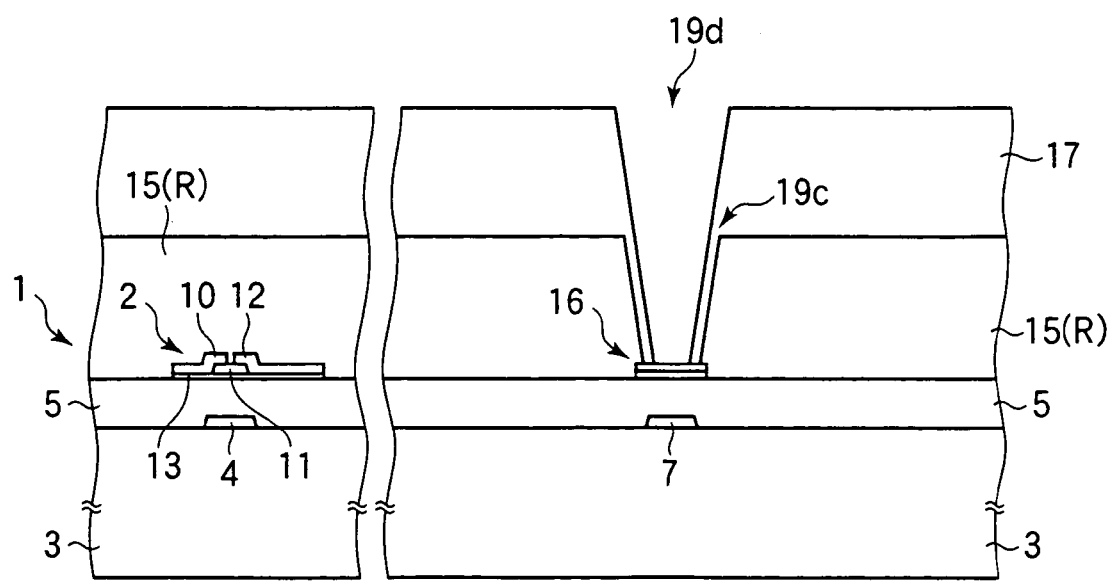
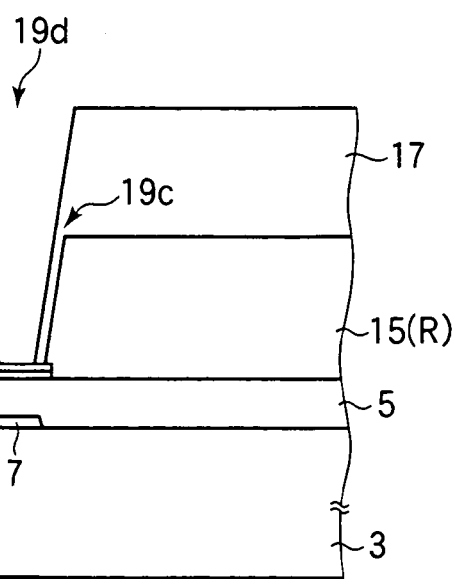

SUBSTRATE FOR LIQUID CRYSTAL DISPLAY AND LIQUID CRYSTAL DISPLAY UTILIZING THE SAME

BACKGROUND OF THE INVENTION

1. Field of the Invention

The present invention relates to a substrate for a liquid crystal display and a liquid crystal display utilizing the same and, more particularly, to a substrate for a liquid crystal display in which color filters are formed on an array substrate having switching elements such as thin film transistors formed thereon and a liquid crystal display utilizing such a substrate for a liquid crystal display.

2. Description of the Related Art

Active matrix liquid crystal displays (LCDs) utilizing thin film transistors (TFTS) as switching elements that have been proposed in the past include inverted staggered structure TFT-LCDs (for example, see Japanese Patent Laid-Open No. JP-A-6-202153). In order to achieve greater aperture ratios, proposals have recently been made on LCDs utilizing an LCD substrate having a CF-on-TFT structure in which color filters are formed on an array substrate having switching elements such as TFTs formed thereon (for example, see Japanese Patent Laid-Open No. JP-A-10-39292). On such an LCD substrate having the CF-on-TFT structure, a passivation film made of an inorganic insulating material is normally formed on TFTs except regions for contact with pixel electrodes.

FIG. 13 is a plan view of an example of one pixel region of an LCD substrate having the CF-on-TFT structure according to the related art, and FIG. 14 is a sectional view along the line B—B in FIG. 13. Gate bus lines (GB) 102 are formed on a transparent insulated substrate 101 that constitutes a TFT substrate 100. An insulation film 103 is formed throughout the substrate over the gate bus lines 102, and drain bus lines (DB) 104 are formed across the gate bus lines 102 with the insulation film 103 interposed therebetween. Regions defined by the gate bus lines 102 and the drain bus lines 104 constitute pixel regions. TFTs 105 are formed in the vicinity of positions where the gate bus lines 102 and the drain bus lines 104 intersect.

A TFT 105 has a drain electrode 108 constituted by a top metal layer 106a and an ohmic contact layer 107a, and it is formed such that an end thereof is positioned on an end of a channel protection film 109 formed above a gate bus line 102. A source electrode 110 constituted by a top metal layer 106b and an ohmic contact layer 107b is formed similarly to the drain electrode 108 at another end of the channel protection film 109. An active semiconductor layer 111 is formed between the insulation film 103 and the channel protection film 109, and the active semiconductor layer 111 is connected to the ohmic contact layers 107a and 107b. In a TFT 105 having such a configuration, the region of the gate bus line 102 directly below the channel protection film 109 serves as a gate electrode, and the insulation film 103 located between those regions serves as a gate insulation film.

A passivation film 112 made of a silicon nitride (Si$_3$NX; hereinafter referred to as "SiN") is formed above the TFTs 105, and resin CF layers 113 are formed in the pixel regions with the passivation film 112 interposed. An overcoat (OC) layer 114 is formed on the resin CF layers 113, and a transparent oxide electrode film on the OC layer 114 is patterned to form pixel electrodes 115. The pixel electrodes 115 are connected to the source electrodes 110 through contact holes 116a which extend through the OC layer 114 and the passivation film 112. Similarly, the pixel electrodes 115 are connected through contact holes 116b to storage capacitor electrodes 118 that are formed on storage capacitor bus lines (CB) 117 with the insulation film 103 interposed therebetween.

As thus described, the passivation film 112 is formed between the TFTs 105 and the resin CF layers 113 on the TFT substrate having the CF-on-TFT structure according to the related art. For example, resins including pigments dispersed therein as color components are used as the resin CF layers 113, and the passivation film 112 is therefore formed to prevent inorganic components of the pigments from spreading into the active semiconductor layers 111.

However, when the resin CF layers are formed on the TFTs with the SiN passivation film interposed therebetween, the adhesion between the passivation film and the resin CF layers is reduced by changes in the state of a hydroxyl group (OH group) on the surface of SiN with time. This has resulted in problems in that the color filters can come off the SiN surface when the resin CF layers are formed and in that residues of the resin CF layers after etching can remain in contact holes that extend up to the TFTs when the contact holes are formed. Such residues or flakes of color filters can cause problems such as low color purity, and a resultant defect in the patterning of an electrode material formed in a contact hole can result in problems such as lack of contact between the pixel electrode and the TFT.

Incidentally, the documents of the related art are as follows:

[Patent Document 1]
JA-A-6-202153
[Patent Document 2]
JA-A-10-39292

SUMMARY OF THE INVENTION

The invention was made taking such points into consideration, and it is an object of the invention to provide an LCD substrate (base substrate) with the CF-on-TFT structure having no residue or flake of color filters and hence no conduction failure and to provide an LCD utilizing such an LCD substrate.

In order to solve the above-described problems, the invention provides an LCD substrate which can be implemented with a configuration shown in FIG. 1 by way of example. The LCD substrate according to the invention is an LCD substrate having a passivation film formed between a pixel electrode formed in each of a plurality of pixel regions and a switching element for driving the pixel electrode and a CF layer formed on the passivation film, characterized in that the passivation film has a multi-layer structure constituted by a SiN layer and a silicon oxide (SiOX; hereinafter referred to as "SiO") layer or silicon oxynitride (SiOXNY; hereinafter referred to as "SiON") layer, and the SiO layer or SiON layer is formed in contact with the CF layer.

In a TFT substrate 1 configured as shown in FIG. 1 as an LCD substrate, a passivation film 14 formed between a pixel electrode 18 and a TFT 2 which is a switching element has a multi-layer structure constituted by SiN layers 14a and 14b and a SiO layer 14c. The SiO layer 14c is formed at the top and is in contact with resin CF layers 15 formed above the same. Since the state of the surface of the SiO layer 14c is subjected to small changes with time and is therefore stable, the color filter is unlikely to come off when the resin CF layer 15 is formed on the same, and residues of the color filter are unlikely to be generated when the resin CF layer 15 is etched. This holds true when a SiON layer is used instead of the SiO layer 14c.

The invention also provides an LCD including an LCD substrate having a passivation film formed between a pixel electrode formed in each of a plurality of pixel regions and a switching element for driving the pixel electrode and a CF layer formed on the passivation film, an opposite substrate provided opposite to the LCD substrate, and a liquid crystal layer sandwiched between the LCD substrate and the opposite substrate, characterized in that the LCD substrate has a multi-layer structure constituted by a SiN layer and a SiO layer or a SiON layer and in that the SiO layer or the SiON layer is formed in contact with the CF layer.

In the case of such an LCD, since residues or flakes of color filters are unlikely to be generated on an LCD substrate, the occurrence of conduction failures is suppressed, and display characteristics and reliability of an LCD manufactured utilizing the same can be improved.

According to the invention, a passivation film formed between pixel electrodes and switching elements on an LCD substrate has a multi-layer structure constituted by a SiN layer and a SiO layer or a SiON layer, and a CF layer is in contact with the SiO layer or SiON layer. This makes it possible to suppress the generation of flakes or residues of the color filter and to thereby suppress the occurrence of conduction failures, and an LCD substrate and an LCD having high display characteristics and high reliability can therefore be provided.

Further, by adjusting the film thickness of the SiO layer or the SiON layer and the inner structure of the SiN layer, a contact hole formed in the passivation film can be provided with a forwardly tapered sectional configuration to provide an LCD substrate and an LCD having high performance without conduction failures.

BRIEF DESCRIPTION OF THE DRAWINGS

FIGS. 19A and 19B are sectional views taken in processes showing the method of manufacturing the substrate for a liquid crystal display according to Embodiment 2-1 in the second mode for carrying out the invention;

FIGS. 20A and 20B are sectional views taken in processes showing the method of manufacturing the substrate for a liquid crystal display according to Embodiment 2-1 in the second mode for carrying out the invention;

FIGS. 27A and 27B are sectional views taken in processes showing the method of manufacturing the substrate for a liquid crystal display according to Embodiment 2—2 in the second mode for carrying out the invention;

FIGS. 28A and 28B are sectional views taken in processes showing the method of manufacturing the substrate for a liquid crystal display according to Embodiment 2—2 in the second mode for carrying out the invention.

DESCRIPTION OF THE PREFERRED EMBODIMENTS

[First Mode for Carrying Out the Invention]

A detailed description will now be made with reference to the drawings on a first mode for carrying out the invention applied to an LCD utilizing a TFT substrate (base substrate) having TFTs formed thereon as an LCD substrate.

Embodiment 1—1

First, Embodiment 1—1 will be described.

Figure 1:
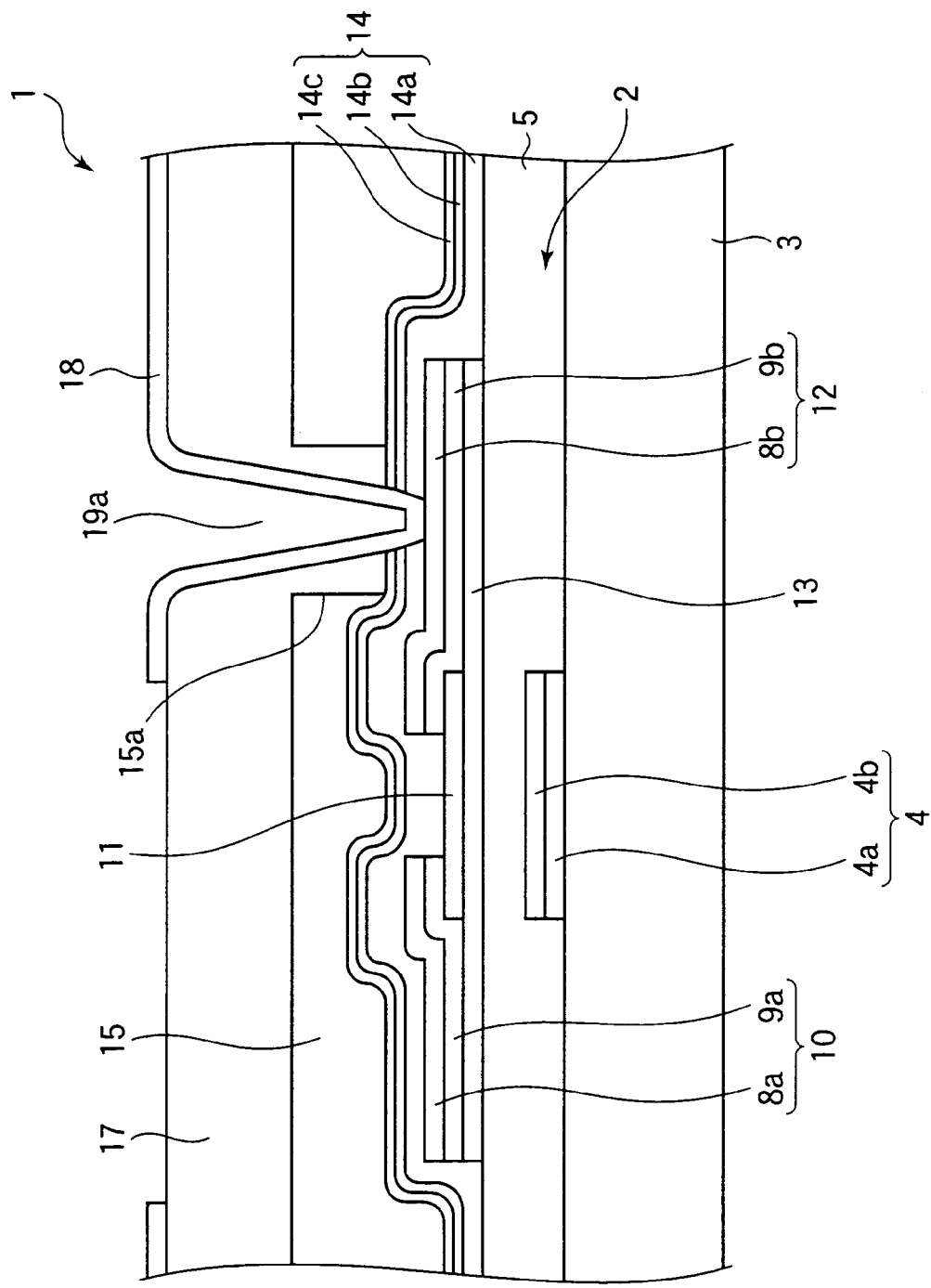
FIG. 1 is a sectional view of a major part of the region of a TFT on a TFT substrate in a first mode for carrying out the invention.
Figure 2:
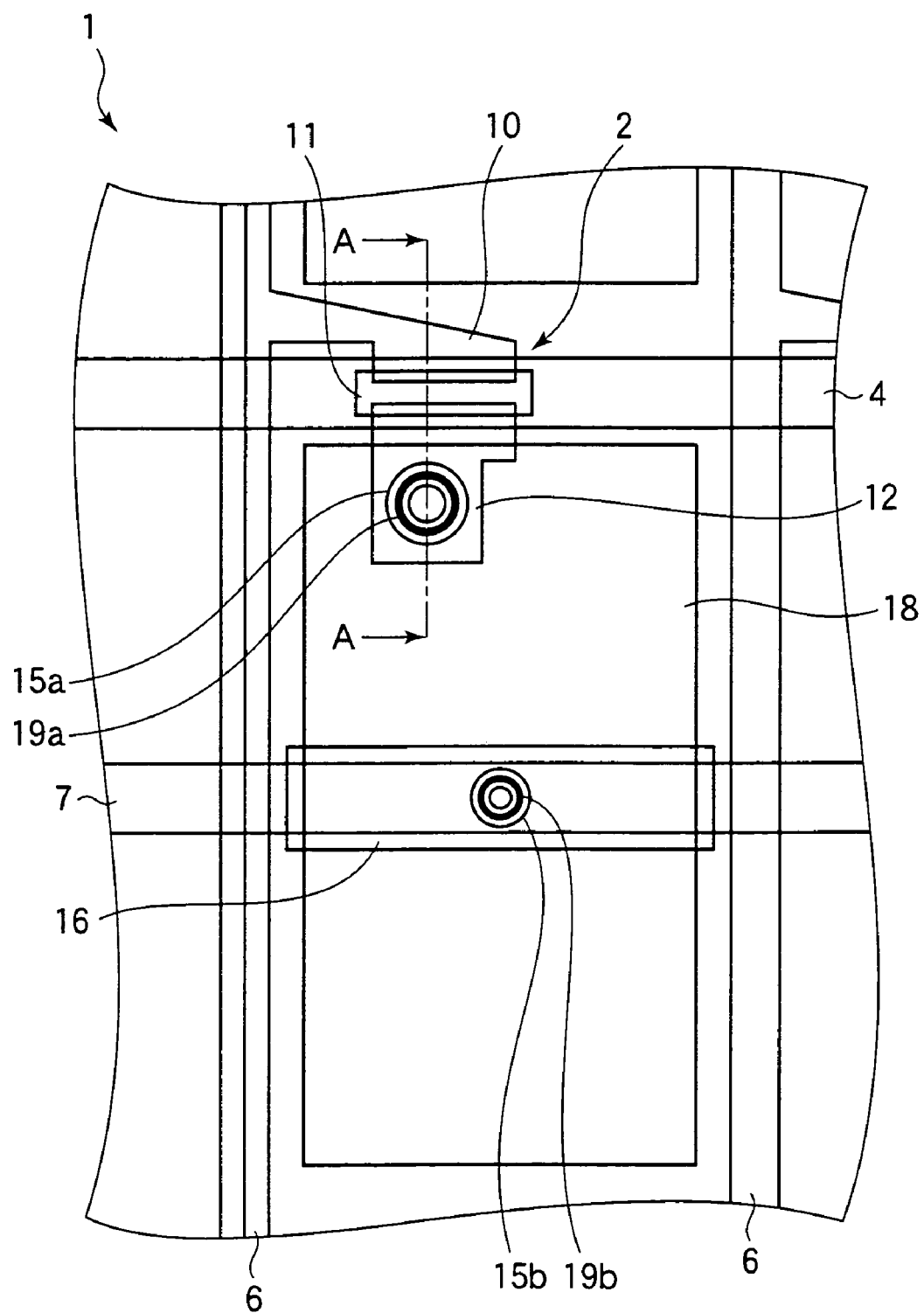
FIG. 2 is a plan view of one pixel region of the TFT substrate in the first mode for carrying out the invention.

FIG. 1 is a sectional view of a major part of the region of a TFT on a TFT substrate according to Embodiment 1—1, and FIG. 2 is a plan view of one pixel region of the TFT substrate of Embodiment 1—1. FIG. 1 shows a section taken along the line A—A in FIG. 2. An LCD according to Embodiment 1—1 has a structure in which a TFT substrate 1 having TFTs 2 as shown in FIGS. 1 and 2 formed thereon as switching elements and an opposite substrate having a common electrode formed thereon are combined and in which a liquid crystal is enclosed between the substrates.

In the TFT substrate 1 used in such an LCD, layers 4b of a metal having a high melting point such as titanium (Ti), chromium (Cr) or molybdenum (Mo) are formed on a glass substrate 3 as a transparent insulated substrate with aluminum (Al) type metal layers 4a interposed therebetween to form a plurality of gate bus lines 4 (only one of which is shown in FIG. 2). An insulation film 5 is then formed throughout the surface, and a plurality of drain bus lines 6 (only two of which are shown in FIG. 2) made of a metal having a high melting point is formed such that they intersect the gate bus lines 4 with the insulation film 5 interposed therebetween. Regions defined by the gate bus lines 4 and the drain bus lines 6 constitute pixel regions of the TFT substrate 1. The TFTs 2 are formed in the vicinity of the intersections between the gate bus lines 4 and the drain bus lines 6. In each pixel region having a TFT 2 formed therein as thus described, a storage capacitor bus line 7 is formed in parallel with the gate bus line 4 such that it extends across the region substantially in the middle thereof. The storage capacitor bus line 7 is configured in a multi-layer structure constituted by an Al type metal layer and a metal layer having a high melting point similarly to the gate bus line 4.

A TFT 2 has a drain electrode 10 constituted by a top metal layer 8a made of a metal having a high melting point and an ohmic contact layer 9a made of $n^+$-type amorphous silicon (a-Si), and it is formed such that an end thereof is positioned at one end of a channel protection film 11 formed above the gate bus line 4. The top metal layer 8a is connected to the drain bus line 6 to connect the drain electrode 10 of the TFT 2 to the drain bus line 6. A source electrode 12 constituted by a top metal layer 8b and an ohmic contact layer 9b is formed similarly to the drain electrode 10 at another end of the channel protection film 11. An active semiconductor layer 13 made of a-Si is formed between the insulation film 5 and the channel protection film 11, and the active semiconductor layer 13 is connected to the ohmic contact layers 9a and 9b. In a TFT 2 having such a configuration, the region of the gate bus line 4 directly below the channel protection film 11 serves as a gate electrode, and the insulation film 5 located between those regions serves as a gate insulation film.

A passivation film 14 constituted by SiN layers 14a and 14b and a SiO layer 14c stacked on one another is formed above the TFT 2, and a resin CF layer 15 is formed in the pixel region with the passivation film 14 interposed. Contact holes 15a and 15b are formed in the resin CF layer 15 such that they reach a region of the passivation film 14 directly above the source electrode 12 and a region of the same directly above a storage capacitor electrode 16, respectively, the electrode 16 being formed on the storage capacitor bus line 7 with the insulation film 5 interposed therebetween. An OC layer 17 is formed using an insulating organic resin material on the resin CF layer 15 having the contact holes 15a and 15b formed therein. A transparent conductive film made of an ITO (indium tin oxide) on the OC layer 17 is patterned to form a pixel electrode 18. The pixel electrode 18 is connected to the source electrode 12 through a contact hole 19a which is formed in the region where the contact hole 15a in the resin CF layer 15 is formed and which extends through the OC layer 17 and the passivation film 14. Similarly, the pixel electrode 18 is also connected to the storage capacitor electrode 16 through a contact hole 19b which extends through the OC layer 17 and the passivation film 14.

In the TFT substrate 1 having the above-described configuration, the passivation film 14 formed between the TFT 2 and the resin CF layer 15 in the region except the contact hole 15a in the resin CF layer 15 has a structure in which the SiN layers 14a and 14b and the SiO layer 14c are stacked on one another in the order listed from the side of the glass substrate 3. The state of an OH group on the surface of the SiO layer 14c formed at the top undergoes substantially no change with time under the environment in which the TFT substrate 1 is manufactured. Thus, the resin CF layer 15 is formed directly on the SiO layer 14c by providing the SiO layer 14c as the uppermost layer of the passivation film 14, which makes it possible to suppress reduction of adhesion between the passivation film 14 and the resin CF layer 15. As a result, flaking of the resin CF layer 15 from the passivation film 14 that occurs during the formation of the layer 15 can be significantly suppressed, and the generation of residues or flakes of the color filter can be significantly suppressed at the time of formation of the contact holes 15a and 15b.

However, when the SiO layer 14c is formed with a great thickness, the passivation film 14 may be etched into a reversely tapered sectional configuration depending on the thickness. The reason is that the passivation film 14 is normally etched using a fluorine type gas which etches the SiO layer 14c at an etching rate lower than that of the SiN layers 14a and 14b. When the passivation film 14 has such a reversely tapered sectional configuration, the transparent conductive material may not be formed on some parts of the film during the subsequent formation of the pixel electrode 18, and contact may not be achieved between the source electrode 12 and the pixel electrode 18 of the TFT 2 or between the storage capacitor electrode 16 an the pixel electrode 18. Therefore, when the passivation film 14 is formed with an overall thickness in the range from about 200 nm to about 400 nm, the thickness of the SiO layer 14c formed at the top of the film is preferably 20 nm or less. The SiO layer 14c is preferably formed with a thickness of 3 nm or more to ensure that the effect of its surface condition is utilized.

Referring to the SiN layers 14a and 14b of the passivation film 14, the SiN layer 14a or the lower layer is formed thicker than the SiN layer 14b or the upper layer such that the upper layer is greater than the lower layer in terms of the density of Si atoms included therein (Si density). In other words, they are formed such that the upper layer is greater than the lower layer in terms of the density of H atoms bonded with Si atoms (Si-H density) in the SiN layers 14a and 14b. Thus, the composition of the Si atoms and N atoms of SiN included in the passivation film 14 is varied to adjust the Si densities or Si-H densities of the upper and lower layers. The etching rates of the layers are thus controlled to etch the passivation film 14 with a forwardly tapered sectional configuration.

A method of manufacturing the TFT substrate 1 will now be described in detail with reference to FIGS. 3 to 12. FIG.

Figure 3:
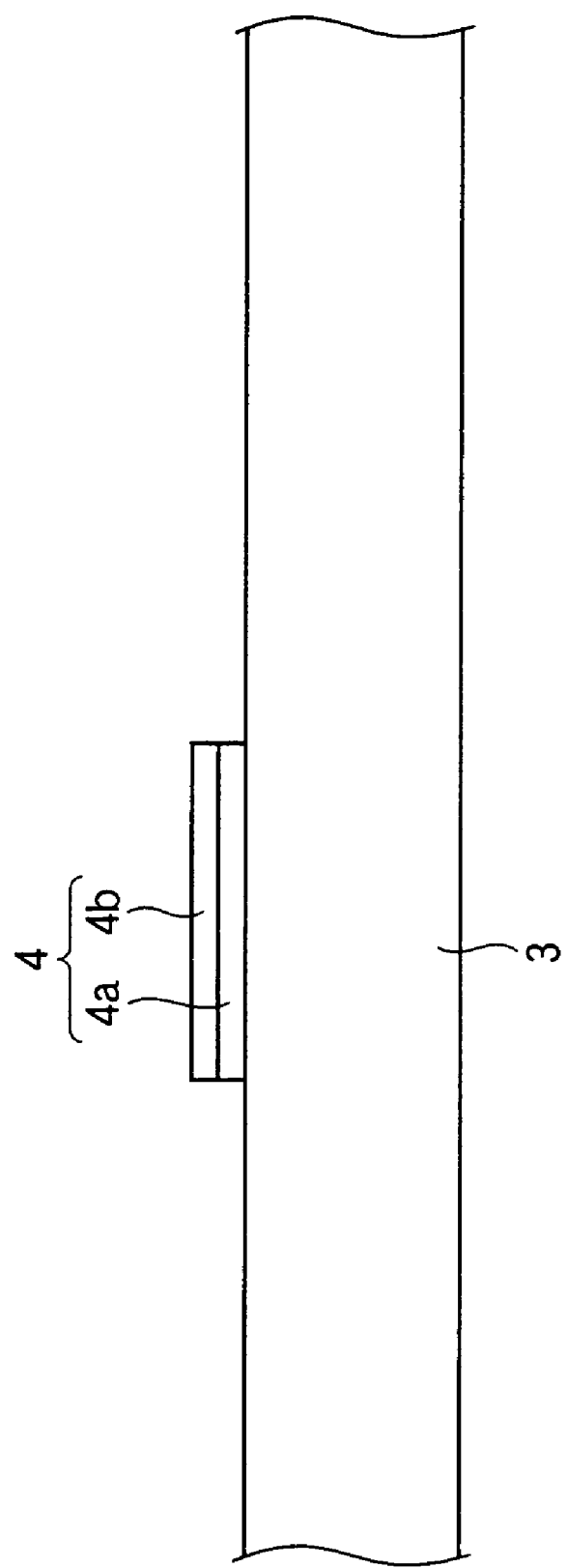
FIG. 3 is an illustration of a step for forming gate bus lines.
Figure 4:
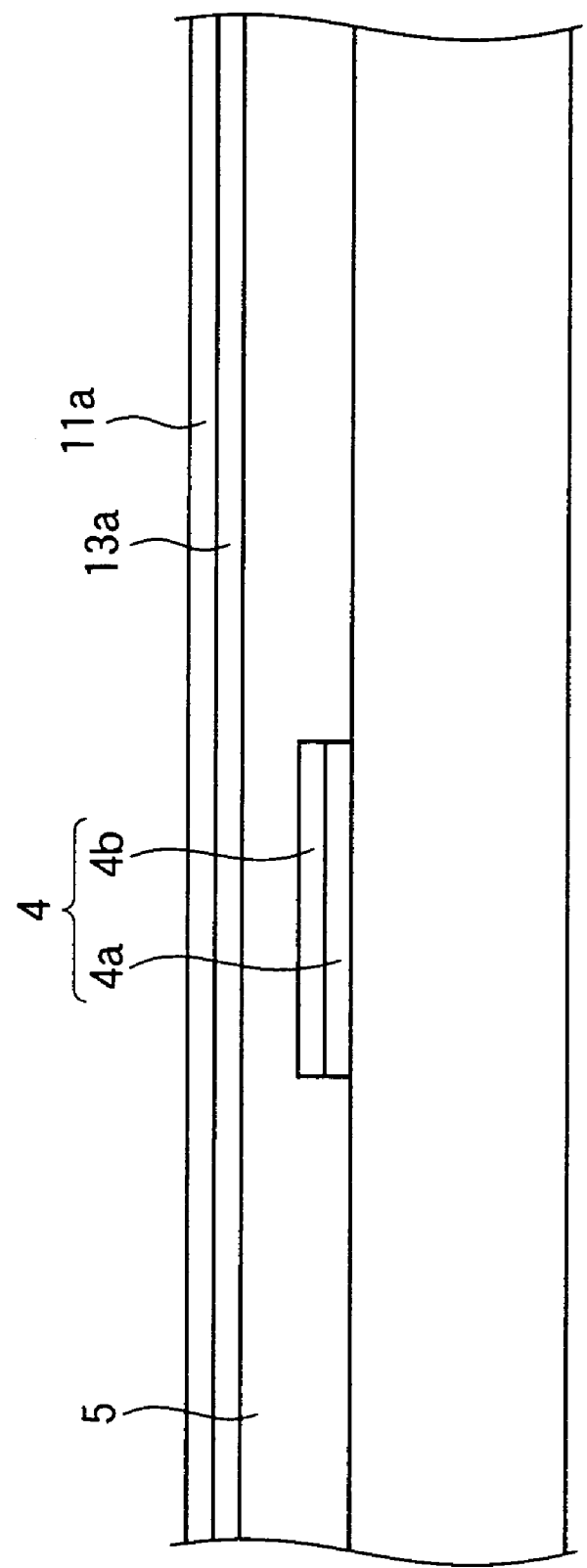
FIG. 4 is an illustration of a step for forming an insulation film.
Figure 5:
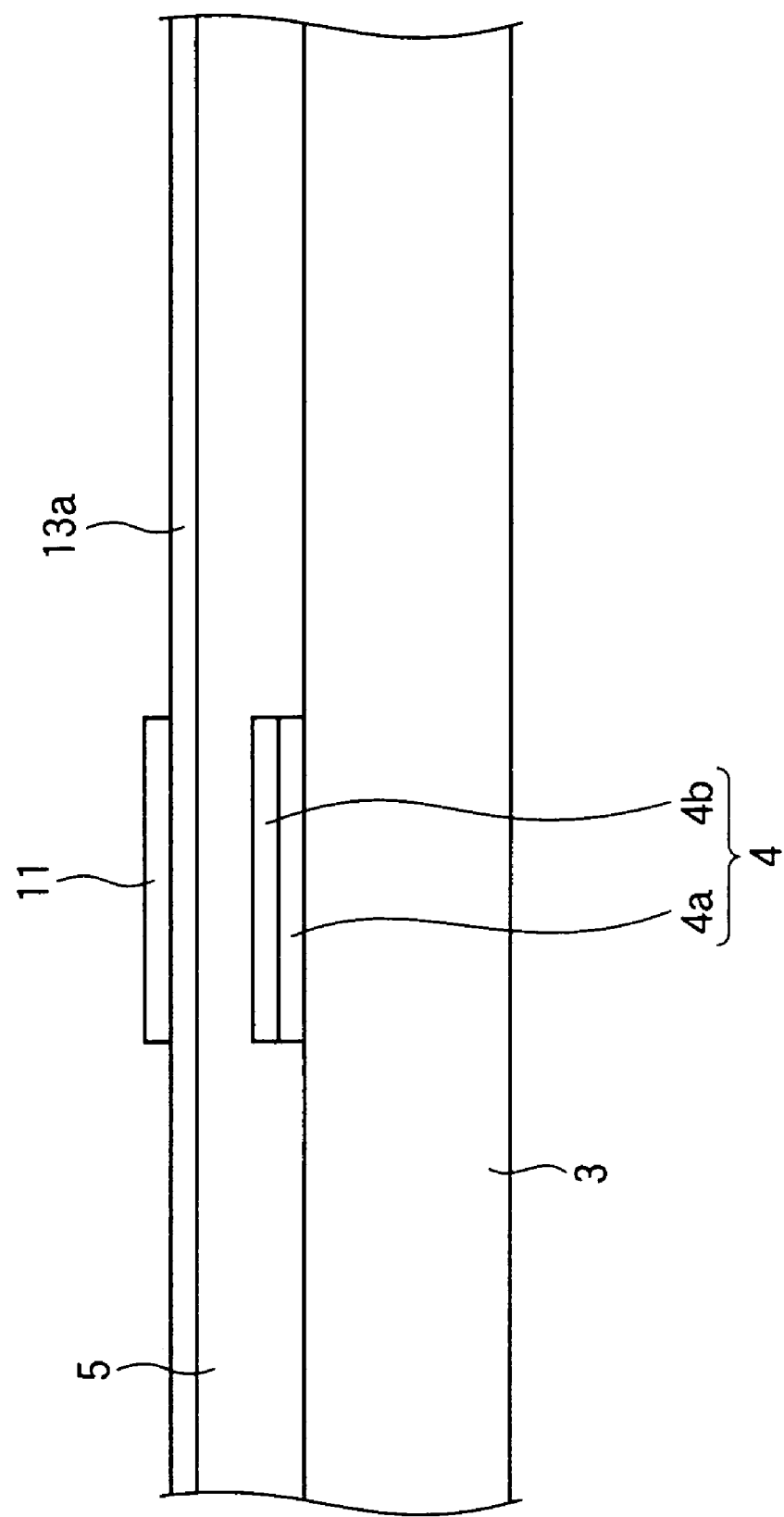
FIG. 5 is an illustration of a step for forming channel protection films.
Figure 6:
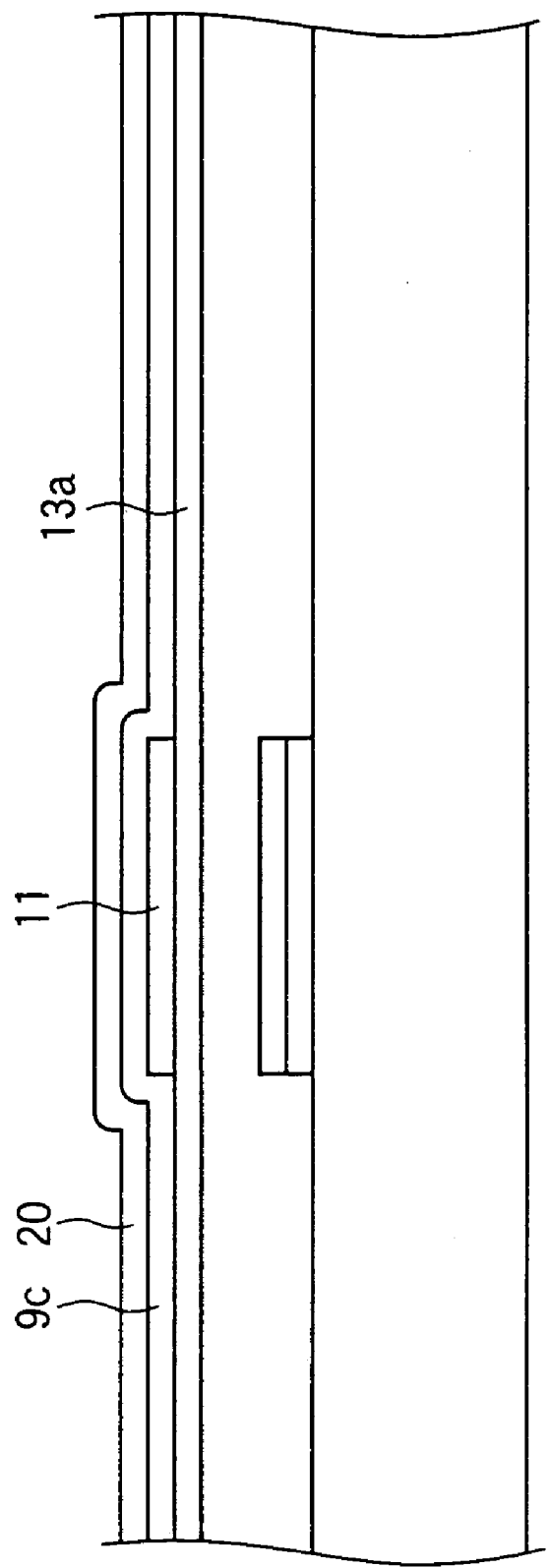
FIG. 6 is an illustration of a step for forming ohmic layers and metal layers.
Figure 7:
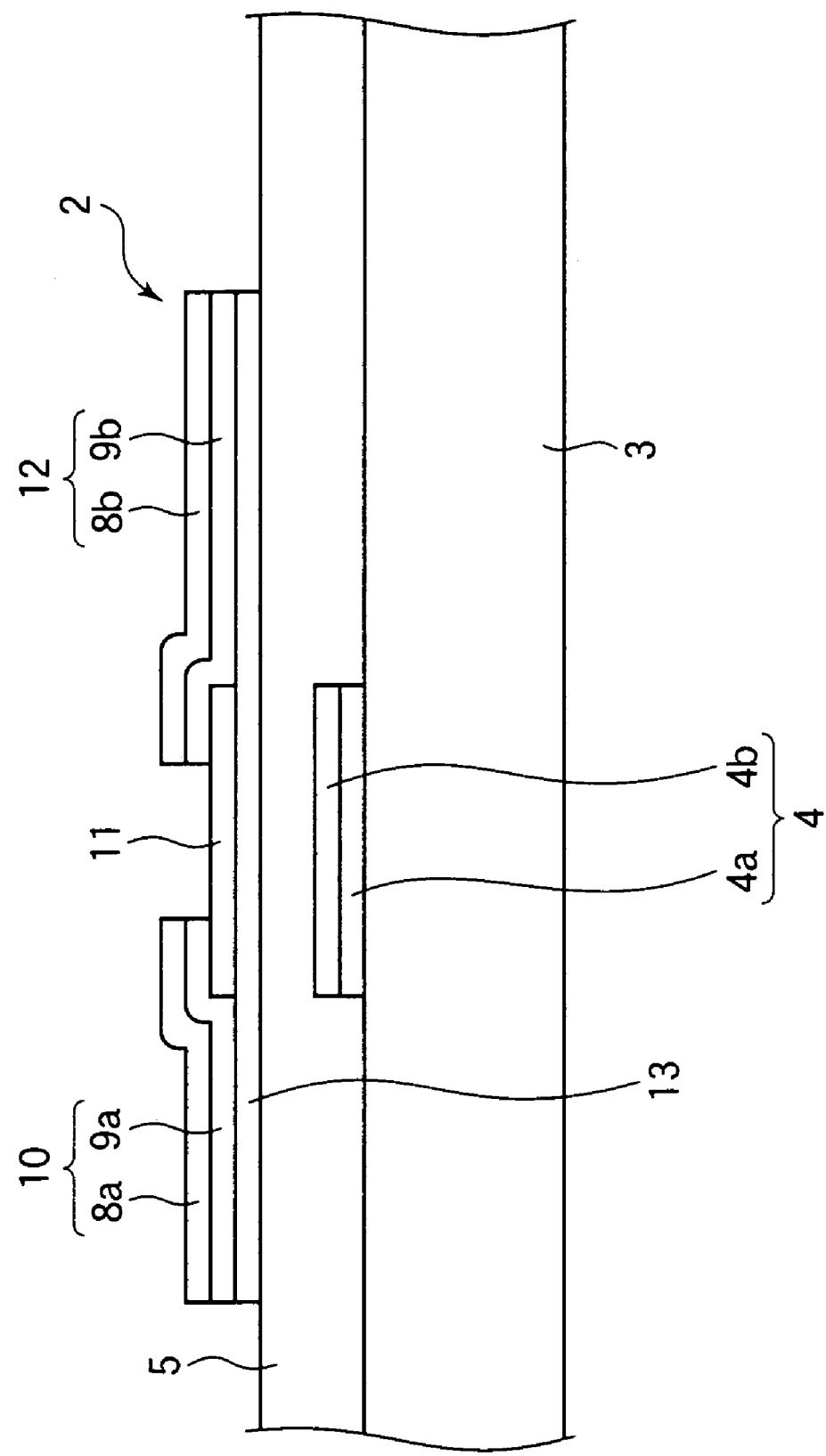
FIG. 7 is an illustration of a step for forming electrodes and active semiconductor layers.
Figure 8:
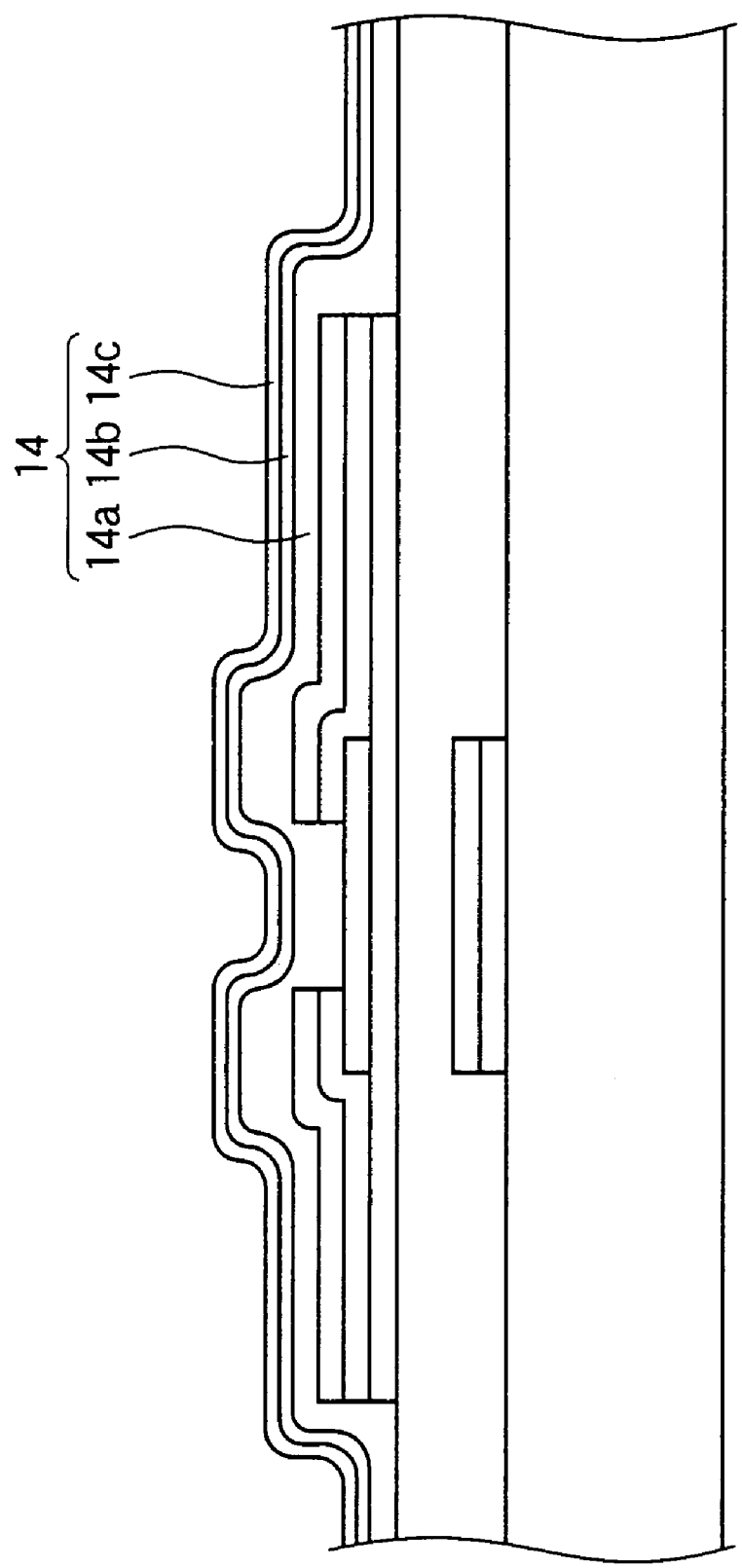
FIG. 8 is an illustration of a step for forming a passivation film.
Figure 9:
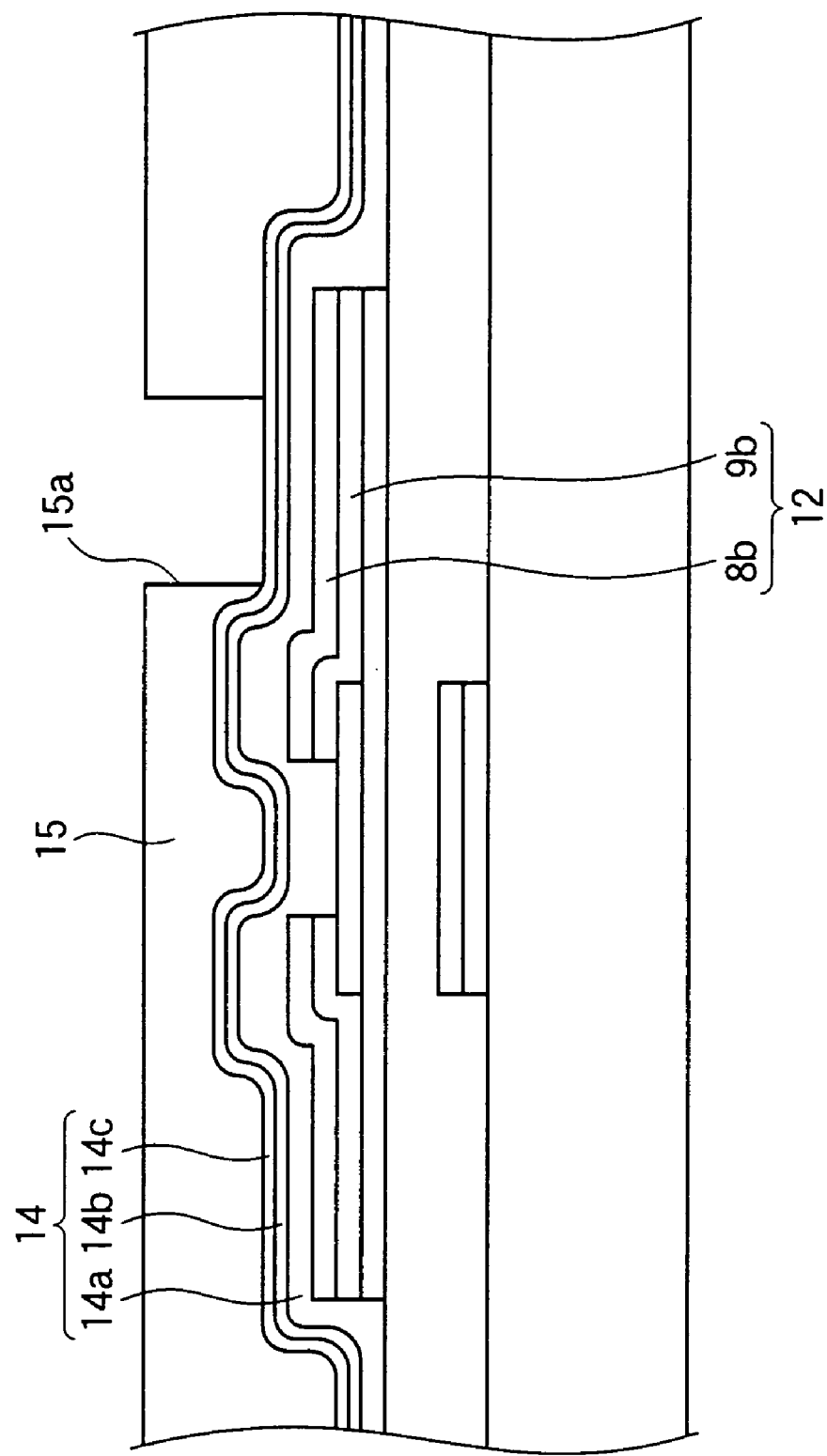
FIG. 9 is an illustration of a step for forming CF layers.
Figure 10:
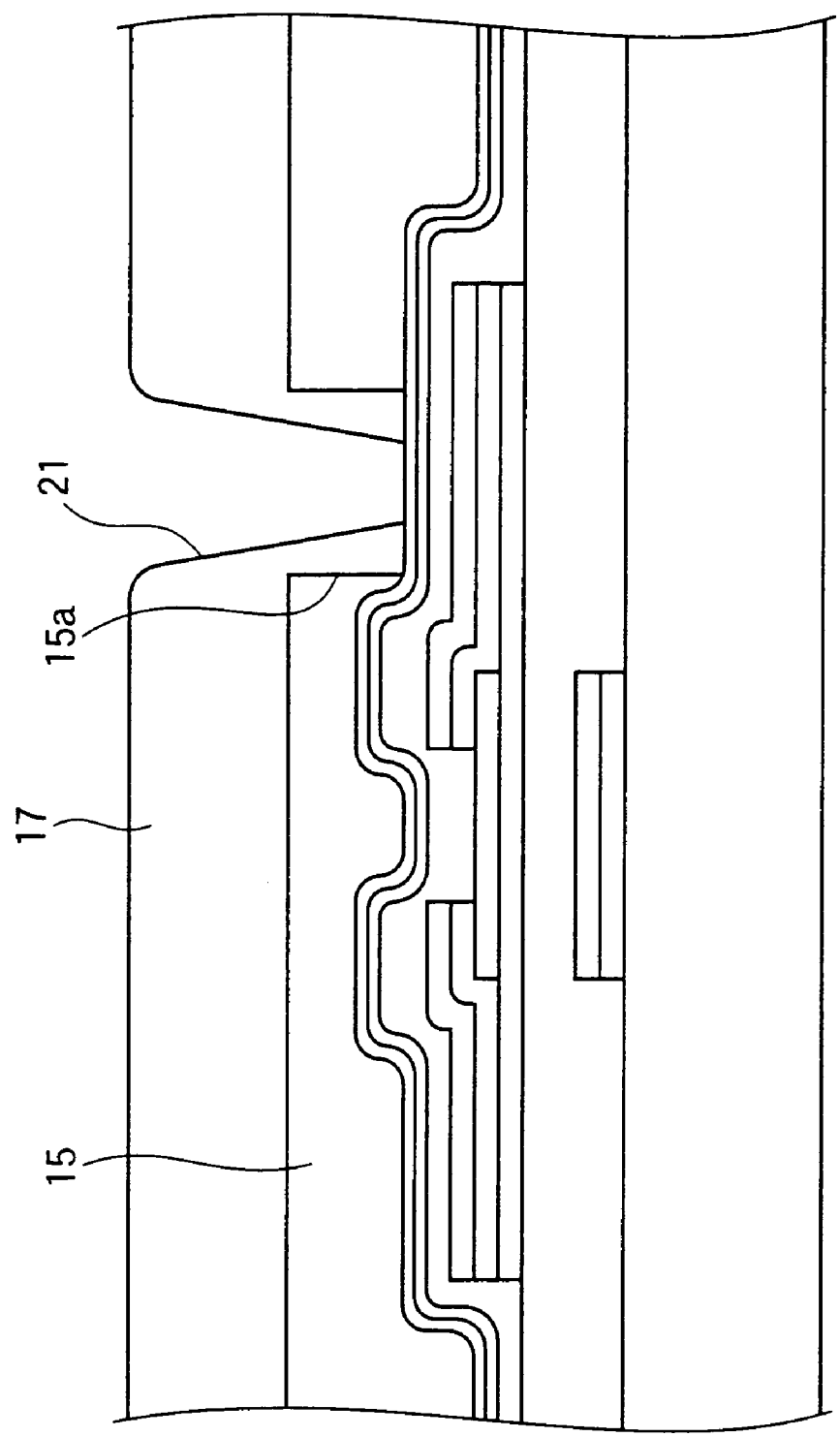
FIG. 10 is an illustration of a step for forming an OC layer.
Figure 11:
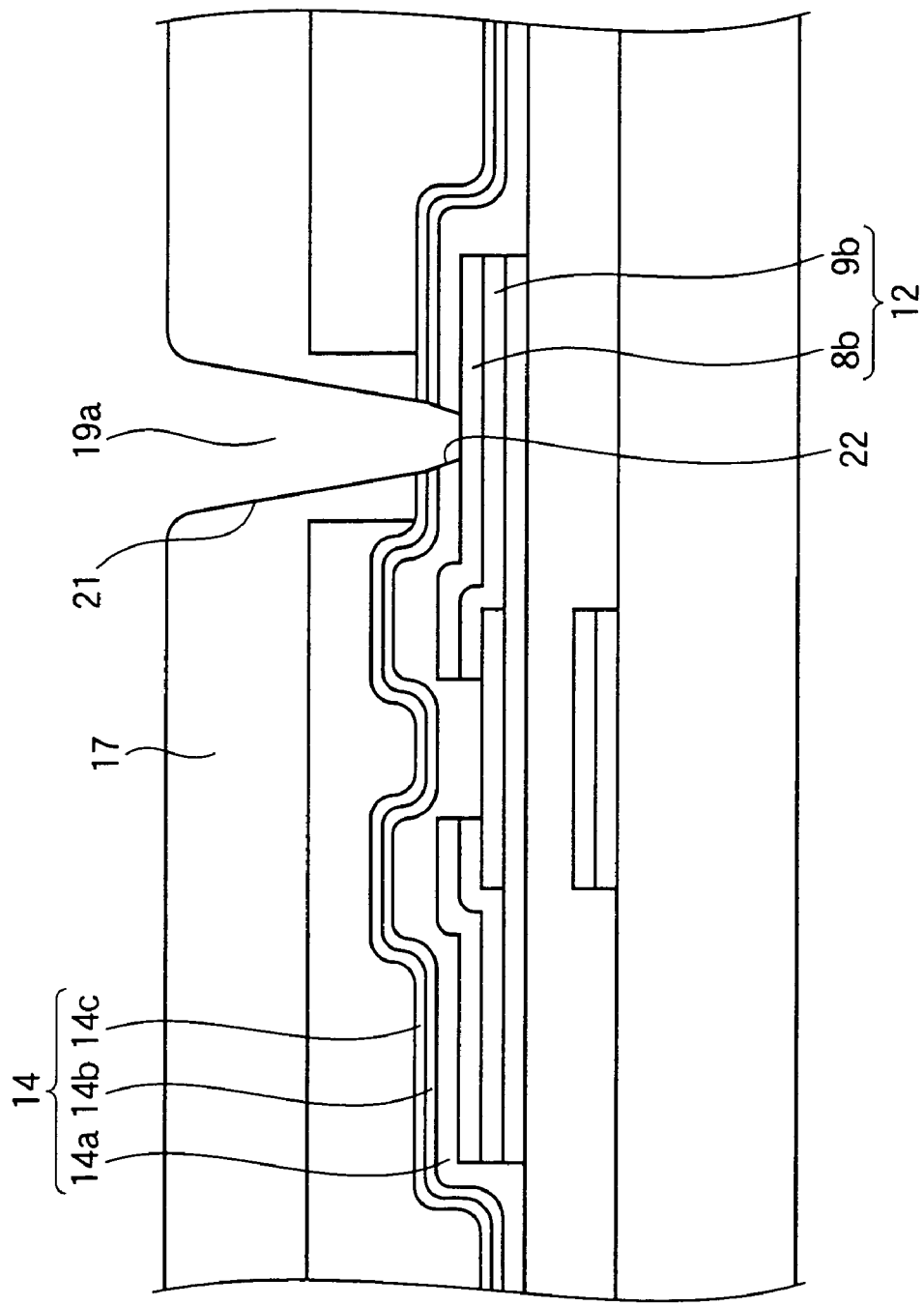
FIG. 11 is an illustration of a step for forming contact holes for connecting pixel electrodes.
Figure 12:
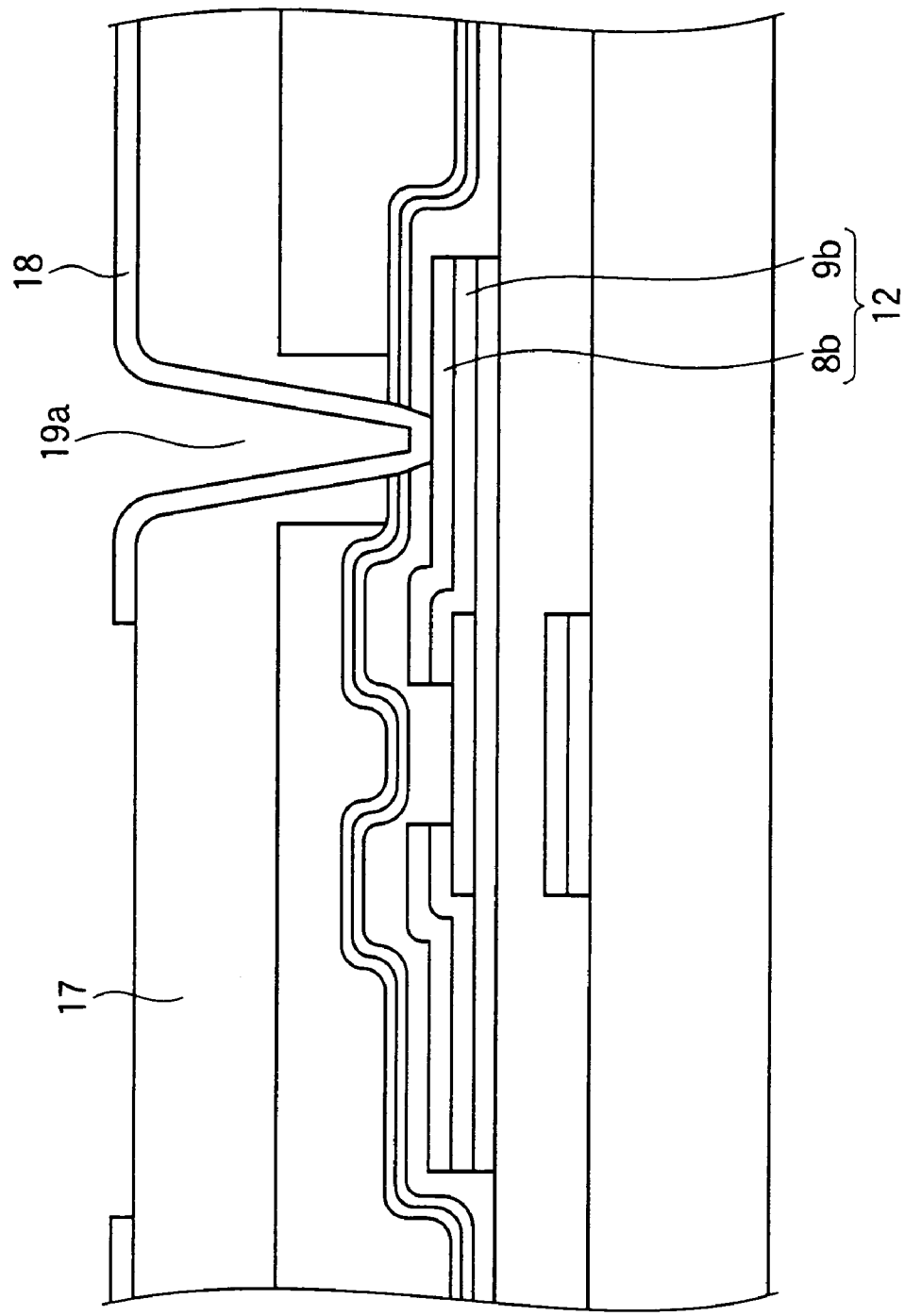
FIG. 12 is an illustration of a step for forming the pixel electrodes.
Figure 13:
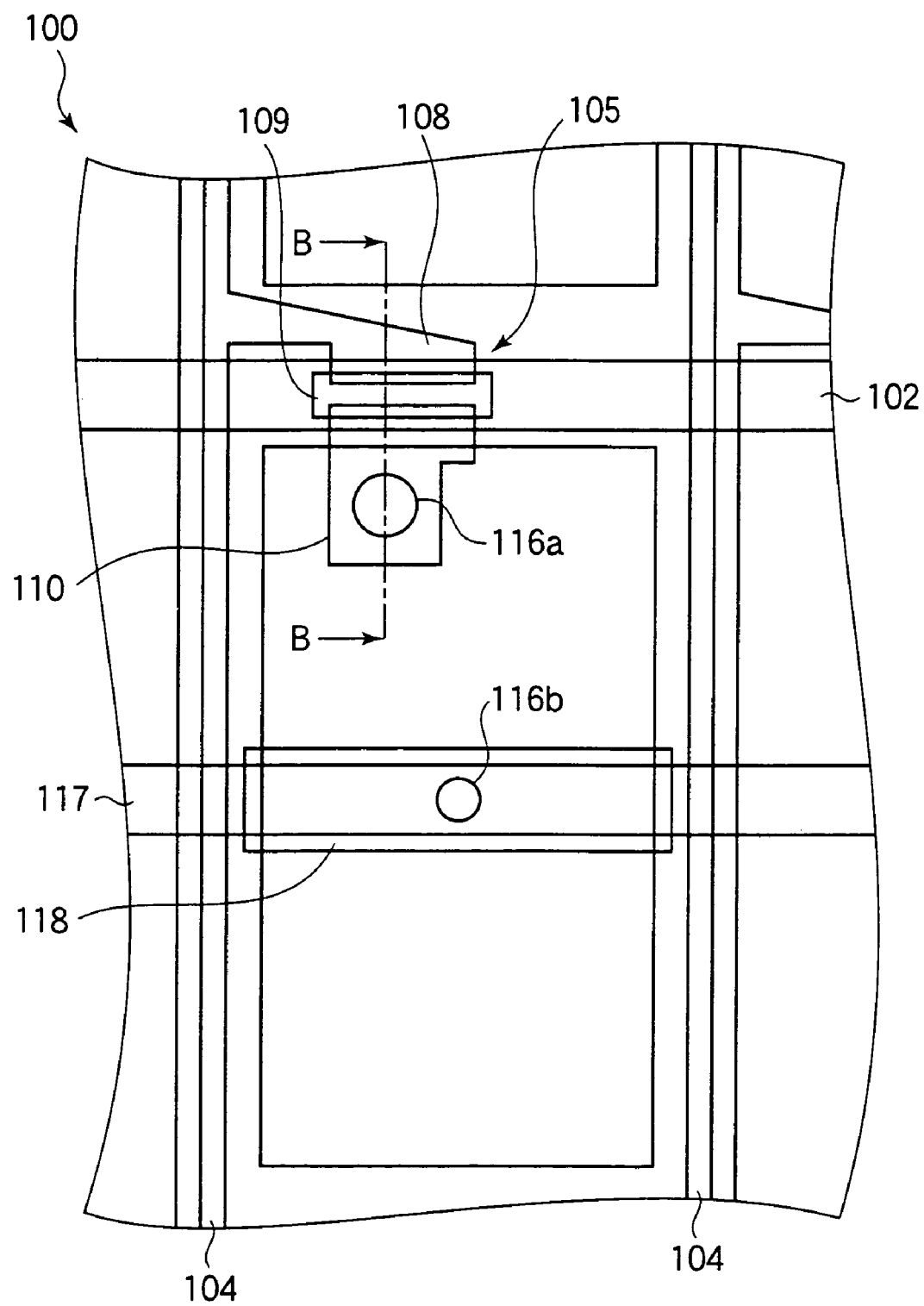
FIG. 13 is a plan view of an example of one pixel region of an LCD substrate having a CF-on-TFT structure according to the related art.
Figure 14:
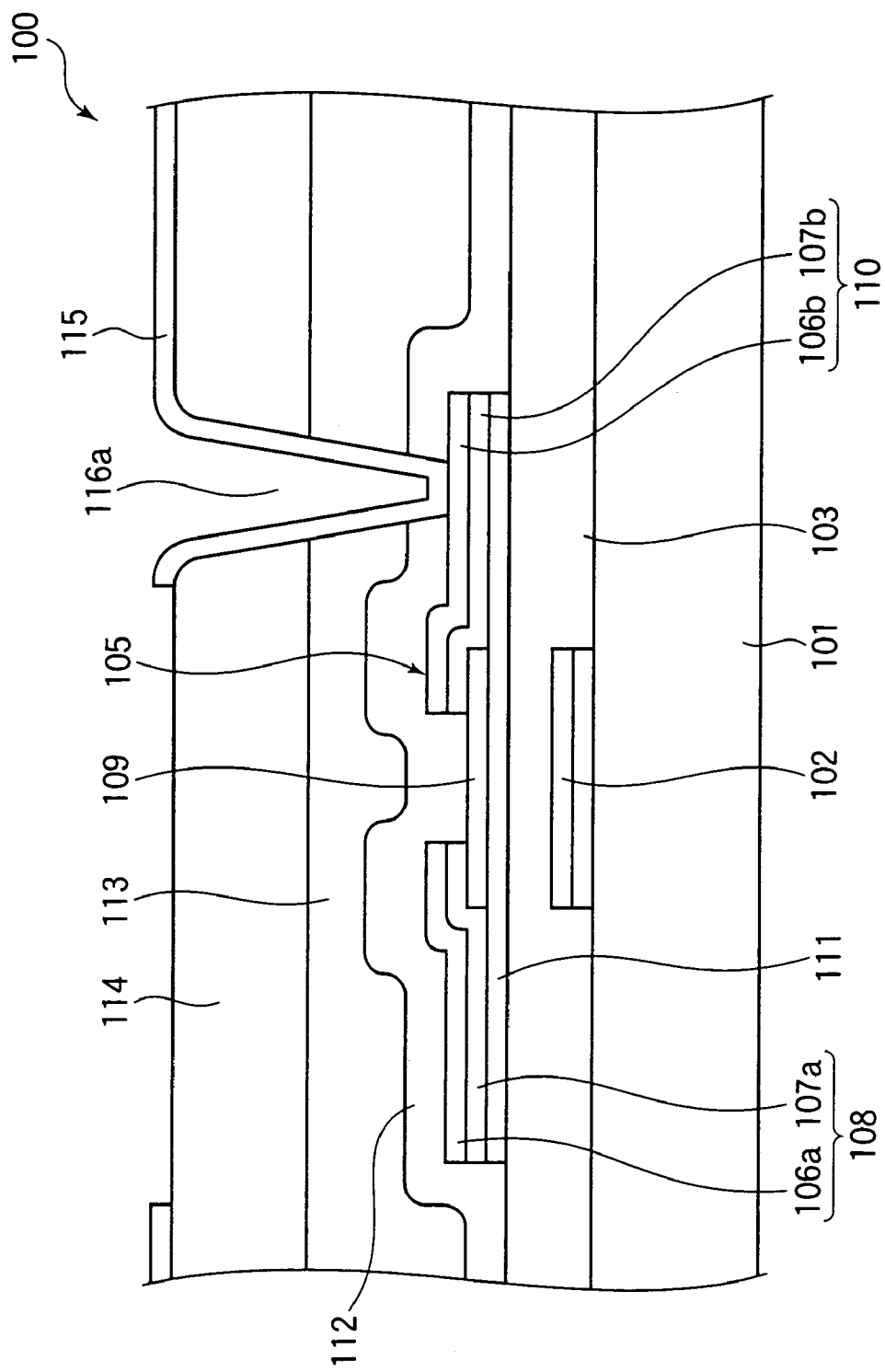
FIG. 14 is a sectional view taken along the line B—B in FIG. 13.

3 is an illustration of a step for forming gate bus lines. FIG. 4 is an illustration of a step for forming an insulation film. FIG. 5 is an illustration of a step for forming channel protection films. FIG. 6 is an illustration of a step for forming ohmic layers and metal layers. FIG. 7 is an illustration of a step for forming electrodes and active semiconductor layers. FIG. 8 is an illustration of a step for forming a passivation film. FIG. 9 is an illustration of a step for forming CF layers. FIG. 10 is an illustration of a step for forming an OC layer. FIG. 11 is an illustration of a step for forming contact holes for connecting pixel electrodes. FIG. 12 is an illustration of a step for forming the pixel electrodes. In FIGS. 3 to 12, the elements shown in FIGS. 1 and 2 are indicated by like reference numerals and will not be described in detail.

First, the step for forming gate bus lines will be described. Gate bus lines 4 are formed by forming a protective film made of SiOX on a glass substrate 3 as occasion demands and forming a film of, for example, Al or Al alloy on the entire surface of the film to a thickness of about 130 nm using a sputtering process, as shown in FIG. 3. For example, a film of a metal having a high melting point such as Ti or Ti alloy is further formed on the same continuously to a thickness of about 70 nm using a sputtering process. As a result, a metal layer having a total thickness of about 200 nm is formed on the glass substrate 3. The Al alloy used to form the metal layer may be a material that is Al including one kind or two or more kinds of elements selected from among neodymium (Nd), silicon (Si), copper (Cu), Ti, tungsten (W), tantalum (Ta) and scandium (Sc). Referring to the metal having a high melting point used to form the metal layer, Cr, Mo, Ta, W and alloys including them may be used instead of Ti or Ti alloy mentioned above.

A resist layer is subsequently formed throughout the substrate, and it is thereafter exposed using a first mask such as a photo-mask or reticle to form a resist mask. Dry etching is then performed using a chlorine type gas to form multi-layer structures constituted by an Al type metal layer 4a and a metal layer 4b having a high melting point as shown in FIG. 3, thereby forming gate bus lines 4. At this time, storage capacitor bus lines 7 as shown in FIG. 2 are formed simultaneously, and terminal electrodes are also formed simultaneously in terminal forming positions of the gate bus lines 4 and the storage capacitor bus lines 7, although not shown.

The step for forming an insulation film will now be described. After forming the gate bus lines 4 as shown in FIG. 3 and the storage capacitor bus lines 7 as shown in FIG. 2, a SiN film is formed throughout the substrate to a thickness of about 400 nm using a plasma CVD (chemical vapor deposition) process as shown in FIG. 4 to provide an insulation film 5. As described above, some parts of the insulation film 5 serve as gate insulation films. Subsequently, an a-Si layer 13a is formed throughout the substrate to a thickness of about 30 nm using a plasma CVD process, and a SiN layer 11a is further formed throughout the substrate to a thickness of about 120 nm using a plasma CVD process.

The step for forming channel protection films will now be described. After the formation of the insulation film 5, the a-Si layer 13a and the SiN layer 11a shown in FIG. 4, a photo-resist is applied to throughout the substrate using spin coating to perform back exposure of the glass substrate 3 using the gate bus lines 4 and the storage capacitor bus lines 7 as masks, thereby leaving unexposed regions directly above the gate bus lines 4 and the storage capacitor bus lines 7 on a self-alignment basis. Next, exposure is performed in a forward direction using a second mask to form a resist pattern in which the photo-resist is left only in regions where channel protection films 11 are to be formed. The pattern is used as an etching mask to perform dry etching with a fluorine type gas on the SiN layer 11a shown in FIG. 4, thereby forming channel protection films 11 as shown in FIG. 5.

The step for forming ohmic layers and metal layers will now be described. After the formation of the channel protection films 11 as shown in FIG. 5, the surface of the a-Si layer 13a is cleaned using diluted HF to remove any natural oxide film on the same, and an $n^+$-type a-Si layer 9c is thereafter formed quickly throughout the substrate to a thickness of about 30 nm using a plasma CVD process as shown in FIG. 6. Subsequently, a metal layer 20 is formed from a Ti(or Ti alloy) film, an Al(or Al alloy) film and another Ti(or Ti alloy) film having thicknesses of about 20 nm, 75 nm and 40 nm, respectively, using a sputtering process in order to form drain bus lines 6, drain electrodes 10, source electrodes 12 and storage capacitor electrodes 16 as shown in FIG. 1 or 2 on the $n^+$-type a-Si layer 9c. Metals having a high melting point such as Cr, Mo, Ta and W and alloys including them may be used as the metal layer 20 instead of Ti. The $n^+$-type a-Si layer 9c serves as an ohmic layer for preferable connection between the metal layer 20 and the a-Si layer 13a.

The step for forming electrodes and active semiconductor layers will now be described. After the metal layer 20 is formed on the $n^+$-type a-Si layer 9c as shown in FIG. 6, a photo-resist layer is formed throughout the substrate, and the photo-resist layer is exposed using a third mask and is developed to form a resist pattern. Dry etching is then performed with a chlorine type gas on the metal layer 20, the $n^+$-type s-Si layer 9c and the a-Si layer 13a shown in FIG. 6 using the resist pattern as a mask. Thus, top metal layers 8a, 8b and ohmic contact layers 9a and 9b are formed as shown in FIG. 7 to form drain electrodes 10 and source electrodes 12, and active semiconductor layers 13 are formed. At this time, drain bus lines 6 and storage capacitor electrodes 16 as shown in FIG. 2 are also formed. The channel protection film 11 serves as an etching stopper during this etching process. TFTs 2 are formed on the glass substrate 3 through the above-described steps.

The step for forming a passivation film will now be described. After the TFTs 2 as shown in FIG. 7 are formed, SiN layers 14a and 14b, and a SiO layer 14c are formed in the order listed throughout the substrate to thicknesses of about 180 nm, about 20 nm and about 5 nm, respectively, using a plasma CVD process as shown in FIG. 8 to form a passivation film 14. The passivation film 14 may be formed using other methods. For example, the SiO layers 14a and 14b may be formed to thicknesses of about 180 nm and about 20 nm, respectively, using a plasma CVD process. Thereafter, an a-Si layer may be formed throughout the substrate to a thickness of about 5 nm, and at least one of an ashing process, high-pressure oxidation, thermal oxidation, a $N_2O$ plasma process and a $N_2+O_2$ plasma process may be performed on the same to form an SiO layer having a thickness of about 5 nm on the surface. Alternatively, after forming the SiO layers 14a and 14b to thicknesses of about 180 nm and about 20 nm, respectively, using a plasma CVD process, at least one of an ashing process, high pressure oxidation, thermal oxidation, an $O_2$ plasma process and UV irradiation may be thereafter performed on the same to form an SiO layer having a thickness of about 5 nm on the surface.

While the SiO layer 14c has a thickness of about 5 nm in this case, it may be formed with a thickness in the range from 3 nm to 20 nm as described above, and the thicknesses of the SiN layers 14a and 14b may be changed accordingly. Referring to the SiN layers 14a and 14b, after forming the first SiN layer 14a under appropriate film forming conditions, the second SiN layer 14b is continuously formed under different film forming conditions such that the upper layer becomes greater than the lower layer in terms of the Si density or Si-H density of those layers.

The step for forming CF layers will now be described. After the formation of the passivation film 14 shown in FIG. 8, a resin CF layer 15 in a predetermined color is formed in each pixel region as shown in FIG. 9. The resin CF layers 15 are formed in the form of stripes on the substrate. For example, when a red resin is to be formed into resin CF layers 15, an acrylic negative photosensitive resin including a red pigment dispersed therein is first applied throughout the substrate to a thickness of about 170 nm using a spin coater or slit coater. Next, proximity exposure is performed using a large mask to expose a pattern such that the red resin will be left in the form of stripes in a plurality of columns where the red resin is to be formed. Finally, development is performed using an alkali developer such as potassium hydroxide (KOH) to form red resin CF layers 15. At the same time when the resin CF layers 15 is formed at the predetermined columns, contact holes 15a are formed in the resin CF layers 15 such that they reach the passivasion film 14 directly above the source electrodes 12. Further, contact holes 15b are also simultaneously formed in the resin CF layers 15 in regions directly above the storage capacitor electrodes 16 as shown in FIG. 2 such that they reach the passivation film 14. Thus, those pixel regions are provided with spectral characteristics of red and are also provided with a light blocking function for preventing external light from entering the TFTs 2.

Blue and green pixel regions are similarly formed. Specifically, referring to blue pixel regions, an acrylic negative photosensitive resin including a blue pigment dispersed therein is applied and patterned to form blue resin CF layers in the form of stripes in columns adjacent to the columns where the red resin is formed. At the same time, contact holes are formed such that they reach the source electrodes and the storage capacitor electrodes of the TFTs in the blue pixel regions, respectively. Referring to green pixel regions, an acrylic negative photosensitive resin including a green pigment dispersed therein is applied and patterned to form green resin CF layers in the form of stripes in columns adjacent to the columns where the blue resin is formed. At the same time, contact holes are provided such that they reach the source electrodes and the storage capacitor electrodes of the TFTs in the green pixel regions, respectively. Thus, each of the pixel regions is provided with spectral characteristics of blue or green and is provided with a light blocking function for preventing external light from entering the TFT.

When the contact holes 15a and 15b are thus provided in the region CF layers 15, since the resin CF layers 15 are formed directly on the SiO layer 14c formed at the top of the passivation film 14, the resin CF layers 15 exhibit high adhesion, and the generation of residues or flakes of the color filters is suppressed.

The step for forming an OC layer will now be described. After the resin CF layers 15 are formed as shown in FIG. 9, an OC layer 17 is formed as shown in FIG. 10. The OC layer 17 is provided by applying an OC resin throughout the substrate after forming the resin CF layers 15 using a spin coater or slit coater as done to form the resin CF layers 15 and by performing a heating process at a temperature of 140° C. or lower. The OC resin used is an acrylic resin having insulating properties and negative photosensitivity. Next, proximity exposure is performed using a large mask, and development is performed using KOH to form the OC layer 17. The OC layer 17 has an opening at least in an electrode reconnecting area of a terminal forming region, and terminal electrodes, the insulation film 5 and the passivation film 14 are exposed at the bottom of the opening in the terminal forming region. Further, contact holes 21 are formed in the OC layer 17 in alignment with the contact holes 15a formed in the resin CF layers 15 as shown in FIG. 10. At this time, contact holes are similarly formed in the OC layer 17 in the regions of the storage capacitor electrodes 16 as shown in FIG. 2 in alignment with the contact holes 15b.

The step for forming contact holes for connecting pixel electrodes will now be described. After the contact holes 21 are formed in the OC layer 17 as shown in FIG. 10, dry etching is performed with a fluorine type gas using the OC layer 17 as a mask as shown in FIG. 11. Thus, the passivation film 14 is removed in the regions thereof exposed at the contact holes 21 to form contact holes 22 that extend up to the source electrodes 12. At this time, the passivation film 14 is similarly removed in the regions of the storage capacitor electrodes 16 as shown in FIG. 2 to form contact holes that extend up to the storage capacitor electrodes 16. Contact holes 19a for connecting pixel electrodes penetrating from the surface of the OC layer 17 down to the source electrodes 12 are formed by the contact holes 21 in the OC layer 17 and the contact holes 22 in the passivation film 14. In the regions of the storage capacitor electrodes 16, contact holes 19b for connecting pixel electrodes as shown in FIG. 2 penetrating from the surface of the OC layer 17 down to the storage capacitor electrodes 16 are similarly formed by the contact holes in the OC layer 17 and the contact holes in the passivation film 14.

Referring to the passivation film 14, the SiO layer 14c is formed at the top and is followed by the SiN layers 14b and 14a in the order listed. The SiO layer 14c is formed with a thickness in the range from 3 nm to 20 nm, and the Si densities or Si-H densities of the SiN layers 14b and 14a are adjusted. Thus, the etching rate of each of the layers is controlled to form the contact holes 22 in the passivation film 14 with a forwardly tapered sectional configuration. That is, the contact holes 19a for connecting pixel electrodes have an opening sectional area which is greatest in the resin CF layers 15 and which is tapered in the subsequent layers, i.e., OC layer 17, SiO layer 14c and SiN layer 14a. This holds true for the contact holes 19b. The term "opening sectional area" means the value of the sectional area of an opening section formed in each layer in the smallest part of the opening. An opening sectional area of the contact holes 19a will be acceptable if a relationship expressed by resin CF layer 15>OC layer 17$\geq$SiO layer 14C$\geq$SiN layer 14a is satisfied in terms of the opening area.

The step for forming pixel electrodes will now be described. After the contact holes 19a for connecting pixel electrodes penetrating from the surface of the OC layer 17 down to the source electrodes 12 are formed as shown in FIG. 11, an ITO is first formed to a thickness of about 70 nm using a thin film forming method such as sputtering. Next, a resist mask in a predetermined pattern is formed on the ITO thus formed, and wet etching is performed using a oxalic acid type etchant to form pixel electrodes 18 which are connected to the source electrodes 12 through the contact holes 19a as shown in FIG. 12. Similarly, storage capacitor electrodes 16 and pixel electrodes 18 as shown in FIG. 2 are connected by an ITO formed in the contact holes 19b.

Finally, a thermal process is performed at a temperature in the range from 150° C. to 230° C. or, preferably, at a temperature of about 200° C. to complete the TFT substrate 1.

An alignment film is formed on the surface having the TFTs 2 of the TFT substrate 1 thus formed, and the substrate is thereafter combined with an opposite substrate having a common electrode formed thereon to enclose a liquid crystal between them. A polarizing film is applied to an outer surface of each of the TFT substrate 1 and the opposite substrate to form an LCD.

Embodiment 1-2

Now, Embodiment 1-2 will be described below. While the passivation film 14 has the multi-layer structure constituted by the SiN layers 14a and 14b and the SiO layer 14c in the above-described Embodiment 1—1, the passivation film 14 formed on the TFT substrate 1 may have a multi-layer structure constituted by SiN layers 14a and 14b and a SiON layer. The SiON layer is preferably formed with a thickness in the range from 3 nm to 20 nm similarly to the above-described SiO layer 14c. The same effect as that of the SiO layer 14c can be provided by using a SiON layer instead of the SiO layer 14c in the passivation film 14. Similarly to the SiO layer 14c, the SiON layer can be formed using a plasma CVD process after the SiN layers 14a and 14b are formed. The SiON layer may be formed by forming an a-Si layer and thereafter performing at least one of an ashing process, high-pressure oxidation, thermal oxidation, a $N_2O$ plasma process and a $N_2+O_2$ plasma process on the same. Alternatively, the SiON layer may be formed by performing at least one of an ashing process, high pressure oxidation, thermal oxidation, an $O_2$ plasma process and UV irradiation after forming the SiO layers 14a and 14b.

Although Embodiments 1—1 and 1-2 have referred to passivation films having SiN layers in a two-layer structure, a passivation film may be configured using three or more SiN layers, and it may alternatively be configured with a single SiN layer.

As described above, in a TFT substrate used for an LCD, a passivation film formed between TFTs and resin CF layers is provided in a multi-layer structure constituted by an SiN layer and a SiO layer or SiON layer, and the SiO layer or SiON layer is formed at the top of the structure. Thus, reduction of adhesion between the passivation film and the resin CF layers can be suppressed. This makes it possible to suppress the occurrence of flaking of color filters during the formation of the resin CF layers and to suppress the generation of residues or flakes of color filters when contact holes are formed in the resin CF layers.

Further, contact holes in the passivasion film can be formed with a forwardly tapered sectional configuration by controlling the thickness of the SiO layer or SiON layer. In the case of a passivation film having two or more SiN layers, contact holes can be formed with a forwardly tapered sectional configuration by adjusting the Si densities or Si-H densities of those SiN layers. This makes it possible to form TFT substrates in which connection is properly established without conduction failures between source electrodes and pixel electrodes and between storage capacitor electrodes and the pixel electrodes at a high yield.

It is therefore possible to provide a TFT substrate and an LCD which are excellent in display characteristics, highly reliable and which have high performance without using a novel resin for CF layers. Since resin CF layers are provided on an array-substrate and are provided with a light-blocking function, LCD manufacturing steps can be simplified as a whole. Further, LCDs having a high aperture ratio and high definition can be mass-produced even if opposite substrates are combined at somewhat low accuracy. For example, this eliminates a need for forming an adhesive such as hexamethyldisilazane (HMDS) between CF layers and a passivation film to prevent flaking of color filters or employing a structure in which a special light-blocking pattern is formed as proposed in the past.

The above-described multi-layer structure for a passivation film may be applied to TFT substrates which do not employ the CF-on-TFT structure in addition to TFT substrates employing the CF-on-TFT structure. Specifically, even in a TFT substrate which does not employ the CF-on-TFT structure, a passivation film formed between the TFTs and the pixel electrodes is provided with a multi-layer structure constituted by a SiN layer and a SiO layer or a multi-layer structure constituted by a SiN layer and a SiON layer as described above. As a result, the surface of the passivation film can be kept stable, and contact holes can be formed with a forwardly tapered sectional configuration, which makes it possible to suppress the occurrence of conduction failures after the pixel electrodes are formed.

When an OC layer made of an insulating organic resin material is formed on a TFT substrate without the CF-on-TFT structure instead of a passivation film made of an inorganic insulating material such as SiN, the thickness of the layer can be as thick as about 3000 nm. Further, since an OC layer has a dielectric constant of about 3 or less, it makes it possible to reduce parasitic capacities at TFTs and to achieve a high aperture ratio. However, when such a thick layer is included in a TFT substrate, great steps are formed at that layer after contact holes are formed, and the contact holes cannot be properly formed into a forwardly tapered sectional configuration. As a result, pixel electrodes formed on that layer can be broken at such steps, and the possibility of conduction failures increases. It is therefore advantageous to use a passivation film having a multi-layer structure constituted by a SiN layer and a SiO layer or a multi-layer structure constituted by a SiN layer and a SiON layer as described above.

[Second Mode for Carrying Out the Invention]

A description will now be made with reference to FIGS. 15 to 29 on a substrate (base substrate) for a liquid crystal display, a liquid crystal display having the same, and a method of manufacturing the same in a second mode for carrying out the invention. Recently, liquid crystal displays are used in notebook personal computers, television sets, monitors and projection displays, and there are increasing demands and diversifying requirements for the same. In general, a liquid crystal display is constituted by two substrates having transparent electrodes and a liquid crystal layer sandwiched between the substrates, and an image is displayed by driving the liquid crystal through application of a voltage between the transparent electrodes to control the transmittance of light from a backlight unit. Light emitted by the backlight is attenuated by various factors, and the maximum transmittance of the same is reduced to about 3% to 10% at the surface of the panel. The reduction in transmittance is attributable to light absorption at polarizers and color filters and the magnitude of the pixel aperture ratio. Structures for achieving an improved pixel aperture ratio include the CF-on-TFT structure in which color filters are formed on a TFT substrate. Since the CF-on-TFT structure eliminates the need for a margin for a positional shift in combining a TFT substrate and an opposite substrate, the pixel aperture ratio can be improved.

Figure 15:
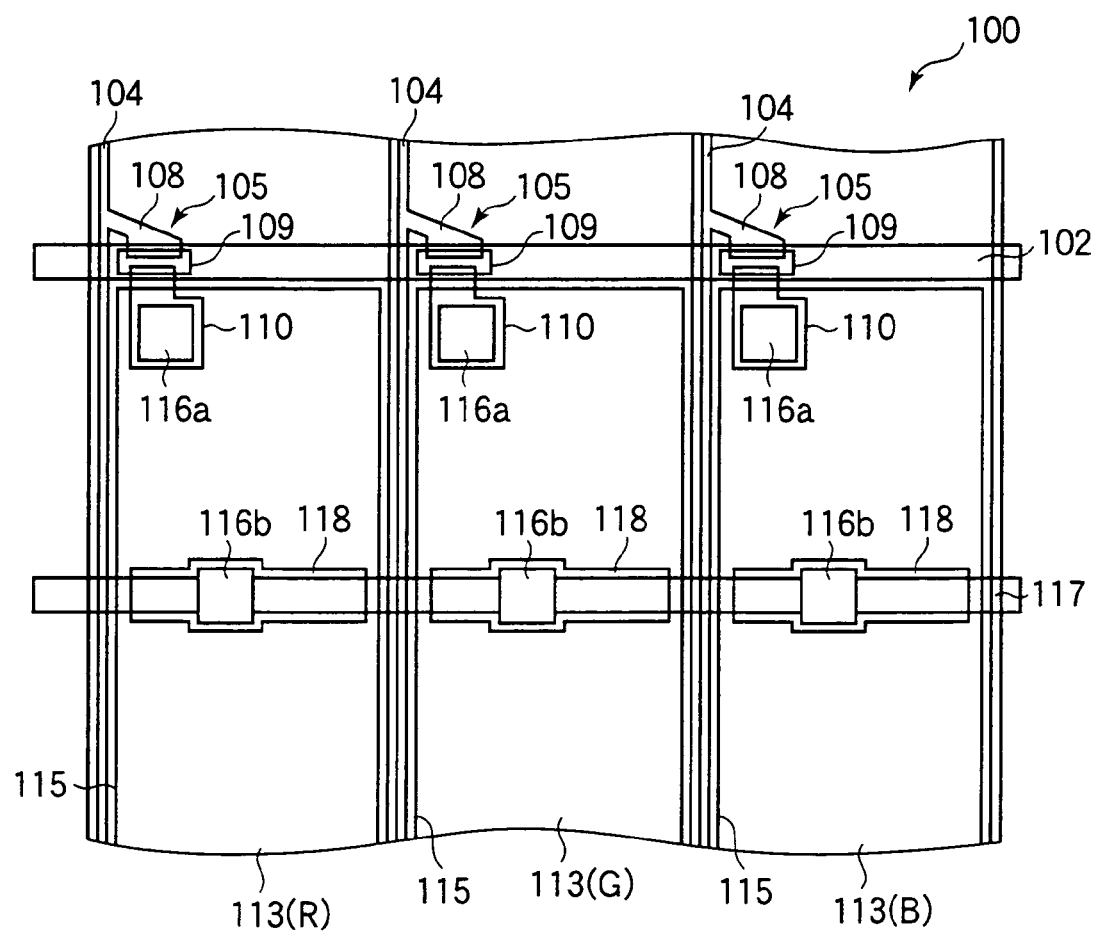
FIG. 15 shows a configuration of a substrate for a liquid crystal display according to the related art that serves as a basis for a second mode for carrying out the invention.

FIG. 15 shows a configuration of three pixels on a TFT substrate 100 according to the related art taken from above. As shown in FIG. 15, the TFT substrate 100 has a plurality of gate bus lines 102 (only one of which is shown in FIG. 15) extending on a glass substrate in the horizontal direction in the figure and a plurality of drain bus lines 104 extending in the vertical direction in the figure across the gate bus lines 102. TFTs 105 are formed in the vicinity of positions where the bus lines 102 and 104 intersect with each other. As shown in FIG. 15, a TFT 105 has a drain electrode 108 that is a branch from a drain bus line 104, a source electrode 110 provided opposite to the drain electrode 108 with a predetermined gap left between them, and a part of a gate bus line 102 which overlaps the drain electrode 108 and the source electrode 110 (a gate electrode). An active semiconductor layer along with a channel protection film 109 thereon is formed on the gate electrode. The gate bus lines 102 and the drain bus lines 104 define pixel regions. A storage capacitor bus line 117 is formed in parallel with the gate bus lines 102 so as to extend across each pixel region substantially in the middle thereof. A resin CF layer 113 is formed in each pixel region. A pixel electrode 115 is formed on the resin CF layer 113 in each pixel region.

The pixel electrode 115 is connected to the source electrode 110 through a contact hole 116a formed through the resin CF layer 113. Similarly, the pixel electrode 115 is connected to a storage capacitor electrode 118 through a contact hole 116b formed through the resin CF layer 113. The bottoms of the contact hole 116a above the source electrode 110 and the contact hole 116b above the storage capacitor electrode 118 have a contour substantially in the form of a square which is 20 $\mu$m×20 $\mu$m in length and width. This results in a need for extending the source electrode 110 inwardly of the pixel to provide a region for connection at the bottom opening of the contact hole 116a and for providing the storage capacitor electrode 118 with an extra region for connection at the bottom opening of the contact hole 116b. Such regions for connection reduce the aperture ratio of the pixel.

The material from which the resin CF layers 113 are formed (a negative type photosensitive color resist) provides a low resolution and requires a great energy for exposure. However, since there is no need for performing high definition patterning or fine patterning on the resin CF layers 113, in general, a step for forming the color filters employs a proximity exposure apparatus which exposes the resist layers with a photo-mask provided close to the same. A proximity exposure apparatus allows a short tact time to provide a high production capacity because it is capable of exposure using irradiation with exposure light having high illumination. However, since the proximity exposure method cannot provide a high resolution because of diffraction of light transmitted by a photo-mask, it is difficult to form contact holes 116a and 116b having a small diameter in the resin CF layers 113 while suppressing variation of the shape and size of the holes. In order to form contact holes having a bottom contour substantially in the form of a square of 20 $\mu$m×20 $\mu$m, a photo-mask is used which is formed with a square light-blocking pattern one size larger than the contour, e.g., a pattern of 28 $\mu$m×28 $\mu$m. As thus described, the area of the opening at the bottom of the contact holes 116a must be increased to ensure the electrical connection between the source electrodes 110 and the pixel electrodes 115 through the contact holes 116a. Similarly, the area of the opening at the bottom of the contact holes 116b must be increased to ensure the electrical connection between the storage capacitor electrodes 118 and the pixel electrodes 115 through the contact holes 116b. Therefore, the aperture ratio of the pixels is reduced by the presence of the contact holes 116a and 116b. A highly accurate stepper or a mirror projection type aligner may be used to improve resolution. However, when those apparatus are used, cost for production facility will be increased because of their high price, and the manufacturing cost of CF-on-TFT structures will be also increased because of an increase in tact time.

Under such circumstances, it is an object of the present mode for carrying out the invention to provide a substrate for a liquid crystal display in which a CF-on-TFT structure having an improved pixel aperture ratio can be obtained at a low cost using a proximity exposure apparatus and to provide a liquid crystal display having the same substrate. A specific description will be made below with reference to Embodiments 2-1 to 2-3.

Embodiment 2-1

Figure 16:
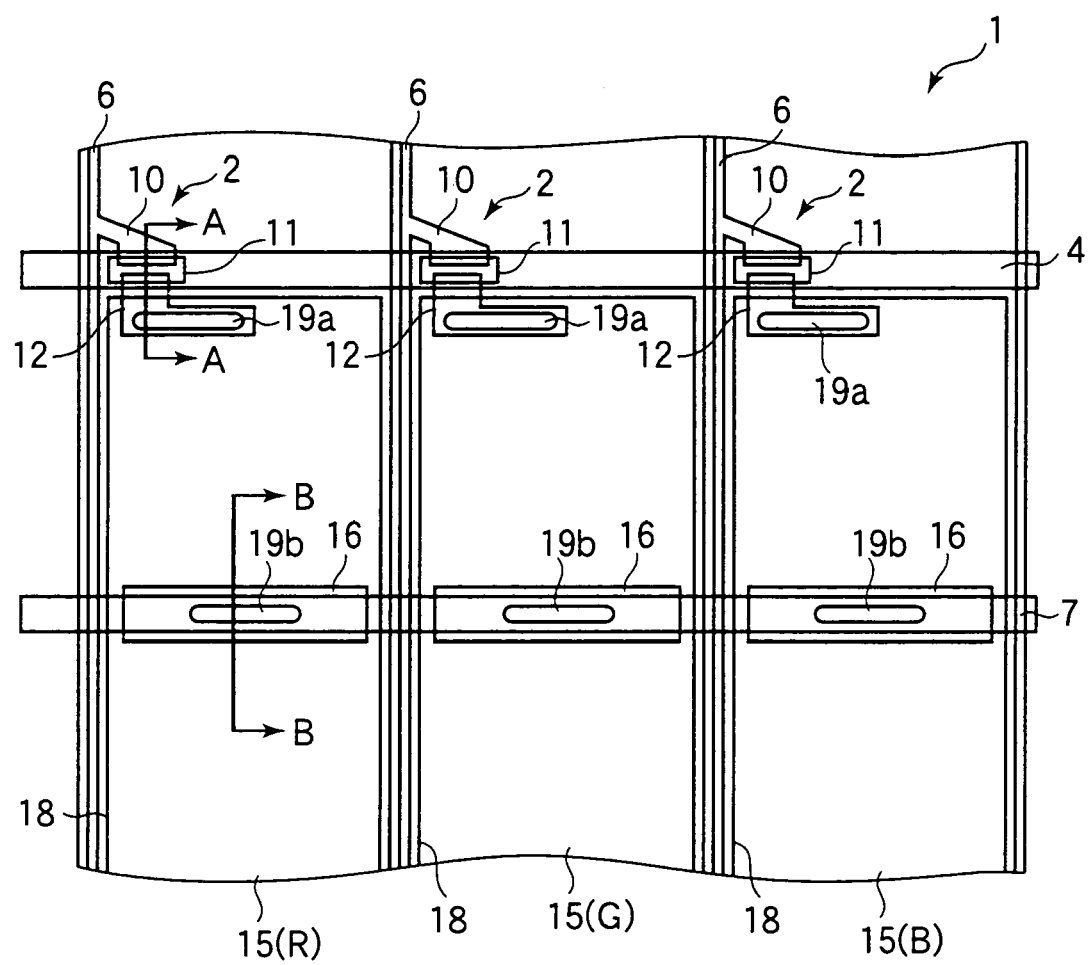
FIG. 16 shows a configuration of a substrate for a liquid crystal display according to Embodiment 2-1 in the second mode for carrying out the invention.
Figures 17A, 17B:
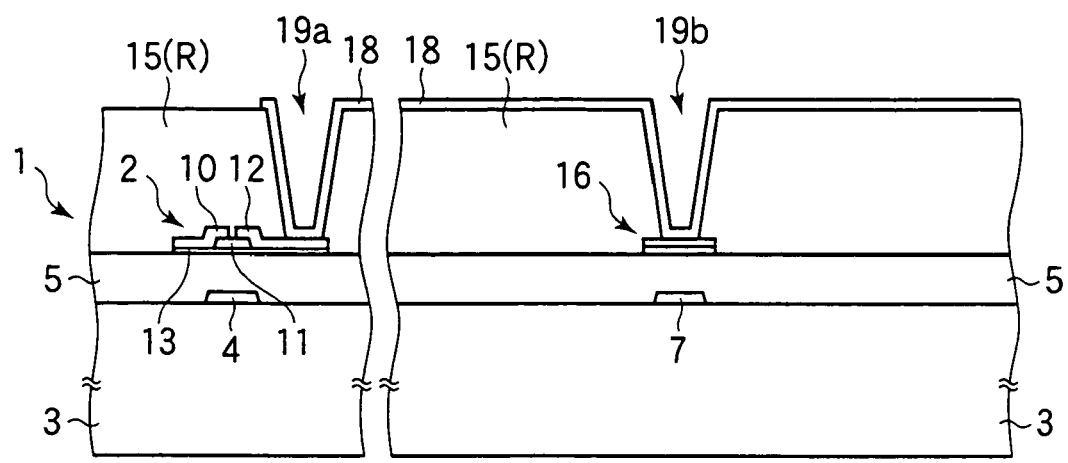
FIGS. 17A and 17B are sectional views showing the configuration of the substrate for a liquid crystal display according to Embodiment 2-1 in the second mode for carrying out the invention.

A description will now be made with reference to FIGS. 16 to 21B on a substrate for a liquid crystal display and a liquid crystal display having the same according to Embodiment 2-1. FIG. 16 shows a configuration of three pixels on a TFT substrate (base substrate) 1 of the present embodiment taken from above. FIGS. 17A and 17B show a section of a part of a red pixel of the TFT substrate 1. FIG. 17A shows a section of the TFT substrate 1 taken along the line A—A in FIG. 16, and FIG. 17B shows a section of the TFT substrate 1 taken along the line B—B in FIG. 16. As shown in FIG. 16, the TFT substrate 1 has a plurality of gate bus lines 4 (only one of which is shown in FIG. 16) extending on a glass substrate 3 in the horizontal direction in the figure and a plurality of drain bus lines 6 extending in the vertical direction in the figure such that they intersect with the gate bus lines 4 with an insulation film 5 interposed between them. Pixel regions are defined by the gate bus lines 4 and the drain bus lines 6. TFTs 2 are formed in the vicinity of positions where the bus lines 4 and 6 intersect with each other. As shown in FIG. 16 and FIGS. 17A and 17B, a part of a straight gate bus line 4 is used as a gate electrode 4 of a TFT 2, and an active semiconductor layer 13 is provided above the gate electrode 4 with the insulation film (gate insulation film) 5 interposed therebetween. A channel protection film 11 is formed on top of the active semiconductor layer 13 above the gate electrode 4. A drain electrode 10 and a source electrode 12 are formed on the channel protection film 11 in electrical isolation from each other. The drain electrode 10 is connected to the drain bus line 6. A storage capacitor bus line 7 is formed in parallel with the gate bus lines 4 so as to extend across each pixel region substantially in the middle thereof. The storage capacitor bus line 7 is formed from the same metal as that used for forming the gate bus lines 4. Storage capacitor electrodes 16 are formed above the storage capacitor bus line 7 with the insulation film interposed therebetween. A resin CF layer 15 is formed in each pixel region. As shown in FIGS. 17A and 17B, the resin CF layers 15 are formed also on the TFTs 2 and the drain bus lines 6. A pixel electrode 18 is formed on the resin CF layer 15 in each pixel region.

The pixel electrode 18 is connected to the source electrode 12 through a contact hole 19a formed through the resin CF layer 15. Similarly, the pixel electrode 18 is connected to the storage capacitor electrode 16 through a contact hole 19b formed through the resin CF layer 15. As shown in FIG. 16, when viewed in a direction perpendicular to the surface the TFT substrate 1, the bottoms of the contact hole 19a above the source electrode 12 and the contact hole 19b above the storage capacitor electrode 16 have a contour formed by two line segments substantially in parallel with each other and outwardly convex curves at ends of the two line segments opposite to each other, the curves connecting those ends to define round corners. Further, the bottom contour of the contact holes 19a and 19b has different lengths in the longitudinal and transverse directions thereof where the transverse direction is a direction in parallel with the two parallel line segments and the longitudinal direction is a direction orthogonal to the transverse direction, for example. For example, the contact holes 19a and 19b of the present embodiment have a contour like a running track in which two parallel line segments substantially in parallel with the gate bus line 4 are formed and in which ends of the two line segments opposite to each other are connected by outwardly convex semi-circles, as shown FIG. 16. The ratio between the length of the major axis (the axis in the transverse direction in the present embodiment) and the length of the minor axis (the axis in the longitudinal direction in the present embodiment) of the contour (ratio between major and minor axial lengths=minor axial length/major axial length) is desirably 0.5 or less. In particular, it is desirable to use the above ratio between major and minor axial lengths for a contact hole having a bottom contour with an internal area of 600 $\mu M^2$ or less. In the present embodiment, the length of the minor axis of the contact holes 19a and 19b is 10 $\mu$m, and the length of the major axis of the same is 40 $\mu$m. The length of the major axis is greater than that of the contact holes 116a and 116b according to the related art, i.e., 20 $\mu$m, and the length of the minor axis is smaller than 20 $\mu$m. As shown in FIGS. 17A and 17B, the contact holes 19a and 19b are formed with an open end contour that is one size greater than the bottom contour and are formed in a tapered configuration in which the holes become smaller, the deeper they become.

While the contact hole 19a has a minor axial length of 10 $\mu$m and a major axial length of 40 $\mu$m, since both ends of the major axis are formed in a semi-circular configuration, the area of the bottom opening is about 375 $\mu M^2$ which represents a decrease of 6% from a similar area of 400 $\mu m^2$ according to the related art. The major axis of the contact hole 19b is formed along the storage capacitor bus line 7, and the minor axis of the same is formed smaller than the width of the storage capacitor bus line 7. Therefore, it is not necessary to provide the storage capacitor electrode 16 with a special region to be used for connection at the bottom opening of the contact hole 19b. This makes it possible to achieve an improved aperture ratio compared to the related art.

Figures 18A, 18B:
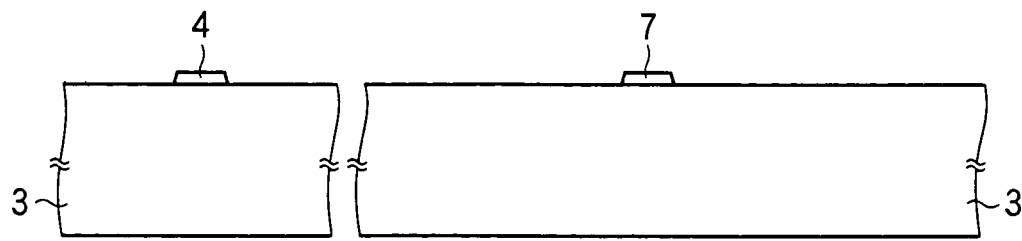
FIGS. 18A and 18B are sectional views taken in processes showing a method of manufacturing the substrate for a liquid crystal display according to Embodiment 2-1 in the second mode for carrying out the invention.

A description will now be made with reference to sectional views taken at manufacturing steps shown in FIGS. 18A to 21B on a method of manufacturing the substrate for a liquid crystal display according to the present embodiment. In FIGS. 18A to 21B, the figures indicated by the suffix A show a section of a TFT substrate 1 taken along the line A—A shown in FIG. 16, and the figures indicated by the suffix B show a section of the TFT substrate 1 taken along the line B—B shown in FIG. 16. First, as shown in FIGS. 18A and 18B, an aluminum (Al) layer having a thickness of, for example, 100 $\mu$m and a titanium (Ti) layer having a thickness of 50 nm are formed in the order listed on an entire top surface of a glass substrate 3 and are patterned to form gate bus lines 4 and storage capacitor bus lines 7. The patterning is performed using a photolithographic process in which a predetermined resist pattern is formed on the layers to be patterned; the resultant resist pattern is used as an etching mask to etch the layers to be patterned; and the resist pattern is then removed.

For example, a silicon nitride film (SiN film) 5 having a thickness of 350 nm, an a-Si film 13a having a thickness of 30 nm, and another SiN film having a thickness of 120 nm are then continuously formed. Next, a resist layer is formed throughout the surface, and back exposure is performed using the gate bus lines 4 as a mask. Further, exposure is performed in a forward direction using a mask to pattern the resist layer. The SiN film is etched using the patterned resist layer as an etching mask to form channel protection films 11 as shown in FIG. 19A.

Then, for example, an $n^+$-type a-Si layer having a thickness of 30 nm, a Ti layer having a thickness of 20 nm, an Al layer having a thickness of 75 nm, and another Ti layer having a thickness of 40 nm are formed in the order listed as shown in FIGS. 20A and 20B. Patterning is performed using the channel protection films 11 as an etching stopper to form drain electrodes 10, source electrodes 12, drain bus lines 6 (not shown in FIGS. 20A and 20B) and storage capacitor electrodes 16. TFTs 2 are completed through the above described steps.

Figures 21A, 21B:
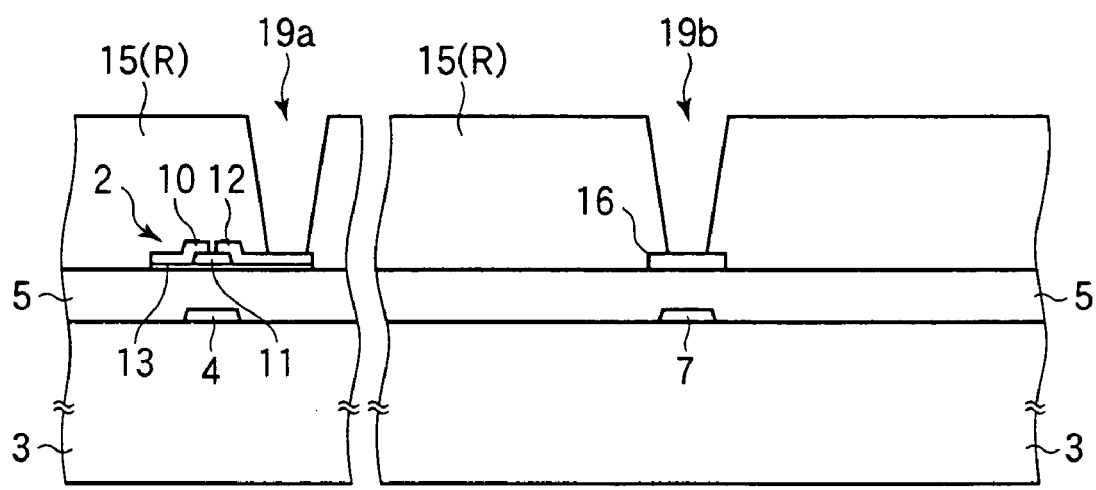
FIGS. 21A and 21B are sectional views taken in processes showing the method of manufacturing the substrate for a liquid crystal display according to Embodiment 2-1 in the second mode for carrying out the invention.

Next, a red resist of a type including a negative photosensitive pigment dispersed therein (manufactured by JSR Corporation) is applied to a thickness of 3.0 $\mu$m, for example. Next, the substrate 3 is set in a proximity exposure apparatus, and a photo-mask for red pixels is provided close to the surface of the substrate 3 with a gap of, for example, about 100 $\mu$m left between them to perform exposure with an exposure energy of about 100 mj. On the photo-mask for red pixels, patterns are drawn which serve as light shields for regions of the surface of the substrate 3 other than red pixel regions and for areas in the red pixel regions where contact holes 19a and 19b are to be formed. While the light-blocking patterns for forming the contact holes 19a and 19b drawn on the photo-mask for red pixels are substantially similar to the contours of the bottoms of the contact holes 19a and 19b to be formed, the patterns are formed greater than the contours by a predetermined offset amount taking diffraction of light into consideration. The ratio between the major and minor axial lengths of the contact holes 19a and 19b is 0.25, and the lengths of the minor and major axes are 10 $\mu$m and 40 $\mu$m, respectively. Therefore, the photo-mask used here is formed with light-blocking patterns having a contour which is formed by, for example, two parallel line segments connected to each other at opposite ends thereof by outwardly convex semi-circles and which has a minor axial length of 18 $\mu$m and a major axial length of 48 $\mu$m. Since the minor axial length (=18 $\mu$m) of the light-blocking patterns is shorter than 28 $\mu$m that is the length of one side of a light-blocking pattern according to the related art, there is a possibility that diffracted exposure light enters the color resist layer in the areas for forming the contact holes 19a and 19b from both ends of the minor axis. On the contrary, since the major axial length (=48 $\mu$m) of the light-blocking patterns is sufficiently longer than 28 $\mu$m that is the length of one side of a light-blocking pattern according to the related art, there will be regions which are not entered by diffracted exposure light from both ends of the major axis at all. Therefore, by adjusting other conditions for exposure, the color resist layer in the areas for forming the contact holes 19a and 19b can be formed with unexposed regions in a direction perpendicular to the surface of the substrate 3. In order to minimize the areas of the openings at the bottom of the contact holes while maintaining the regions which are not entered by diffracted exposure light from both ends of the major axis at all, the ratio between the lengths of the major axis and the minor axis (ratio between major and minor axial lengths=minor axial length/major axial length) is desirably 0.5 or less. In particular, it is desirable to use the above ratio between major and minor axial lengths in forming a small diameter contact hole having a bottom contour with an internal area of 600 $\mu m^2$ or less. After the exposure, development is performed, and unexposed regions of the resist layer are dissolved and removed. After cleaning, a post-baking process is performed for 40 minutes at 230° C. to form resin CF layers 15 (R) having contact holes 19a and 19b formed to expose the source electrodes 12 and the storage capacitor electrodes 16 in the red pixel regions, as shown in FIGS. 21A and 21B. The contact holes 19a and 19b thus formed have rounded corners and have a minor axial length of 10 $\mu$m and a major axial length of 40 $\mu$m. The contact holes 19a and 19b are formed with an open end contour that is one size greater than the bottom contour and are formed in a tapered configuration in which the holes become smaller, the deeper they become.

Similarly, a blue resist of the type including a negative photosensitive pigment dispersed therein is applied to a thickness of 3.0 $\mu$m, for example. The substrate 3 is set in the proximity exposure apparatus, and a photo-mask for blue pixels is provided close to the surface of the substrate 3 to perform exposure. On the photo-mask for blue pixels, patterns are drawn which serve as light shields for regions of the surface of the substrate 3 other than blue pixel regions and for areas in the blue pixel regions where contact holes 19a and 19b are to be formed. While the light-blocking patterns for forming the contact holes 19a and 19b drawn on the photo-mask for blue pixels are substantially similar to the contours of the bottoms of the contact holes 19a and 19b to be formed, the patterns are formed greater than the contours by a predetermined offset amount. After the exposure, development is performed, and a post-baking process is performed to form resin CF layers 15 (B) having contact holes 19a and 19b formed above the source electrodes 12 and the storage capacitor electrodes 16 in the blue pixel regions.

Similarly, a green resist of the type including a negative photosensitive pigment dispersed therein is applied to a thickness of 3.0 $\mu$m, for example. The substrate 3 is set in the proximity exposure apparatus, and a photo-mask for green pixels is provided close to the surface of the substrate 3 to perform exposure. On the photo-mask for green pixels, patterns are drawn which serve as light shields for regions of the surface of the substrate 3 other than green pixel regions and for areas in the green pixel regions where contact holes 19a and 19b are to be formed. While the light-blocking patterns for forming the contact holes 19a and 19b drawn on the photo-mask for green pixels are substantially similar to the contours of the bottoms of the contact holes 19a and 19b to be formed, the patterns are formed greater than the contours by a predetermined offset amount. After the exposure, development is performed, and a post-baking process is performed to form resin CF layers 15 (G) having contact holes 19a and 19b formed above the source electrodes 12 and the storage capacitor electrodes 16 in the green pixel regions.

Next, an ITO film having a thickness of, for example, 70 nm is formed throughout the substrate and is patterned to form pixel electrodes 18 which are in contact with the top surface of the resin CF layers 15 in the pixel regions, inner walls of the contact holes 19a and 19b penetrating through the resin CF layers 15, and the source electrodes 12 and the storage capacitor electrodes 16 exposed at the bottom of the contact holes 19a and 19b, as shown in FIGS. 17A and 17B.

As described above, in the present mode for carrying out the invention, the contact holes 19a and 19b formed in the resin CF layers 15 are provided with a bottom contour having different longitudinal and transverse dimensions, which makes it possible to provide a CF-on-TFT structure having an improved pixel aperture ratio at a low cost using a proximity exposure apparatus.

While contact holes 19a and 19b having a bottom contour in the form of a running track are provided as shown in FIG. 16 in the present embodiment, the invention is not limited to the same. Obviously, contact holes 19a and 19b may be provided which has a bottom contour, for example, in the form of an ellipse in which the two parallel lines substantially in parallel with the gate bus lines 4 are replaced by outwardly convex curves.

Although the resin CF layers 15 (R, G and B) are formed directly on a source/drain forming layer in which the drain electrodes 10, the source electrodes 12 and the drain bus lines 6 are provided in the present embodiment, a protective film may alternatively be formed on the source/drain forming layer, and the resin CF layers 15 (R, G and B) may be formed on the protective film. A protective film may be formed on the resin CF layers 15 (R, G and B), and the pixel electrodes 18 may be formed on the protective film. Obviously, the TFTs 2 and the resin CF layers 15 (R, G and B) may be formed using materials and manufacturing steps other than those described above.

Embodiment 2—2

Figure 22:
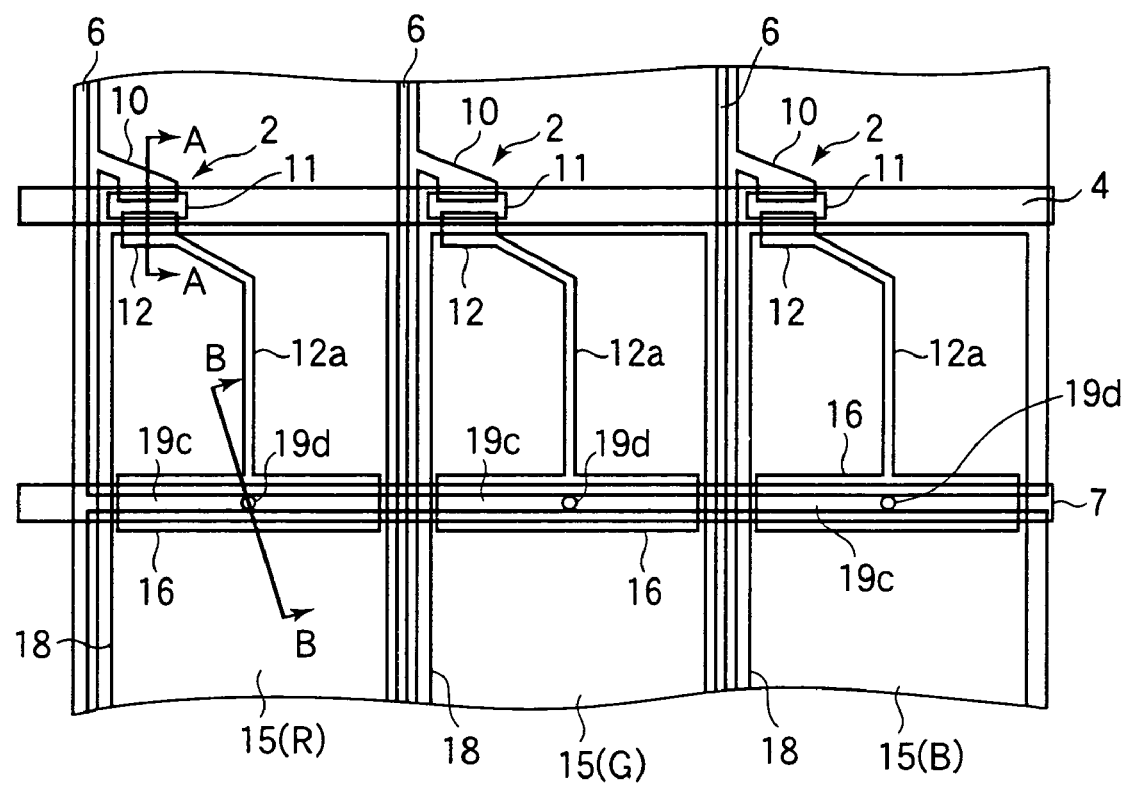
FIG. 22 shows a configuration of a substrate for a liquid crystal display according to Embodiment 2—2 in the second mode for carrying out the invention.
Figures 23A, 23B:
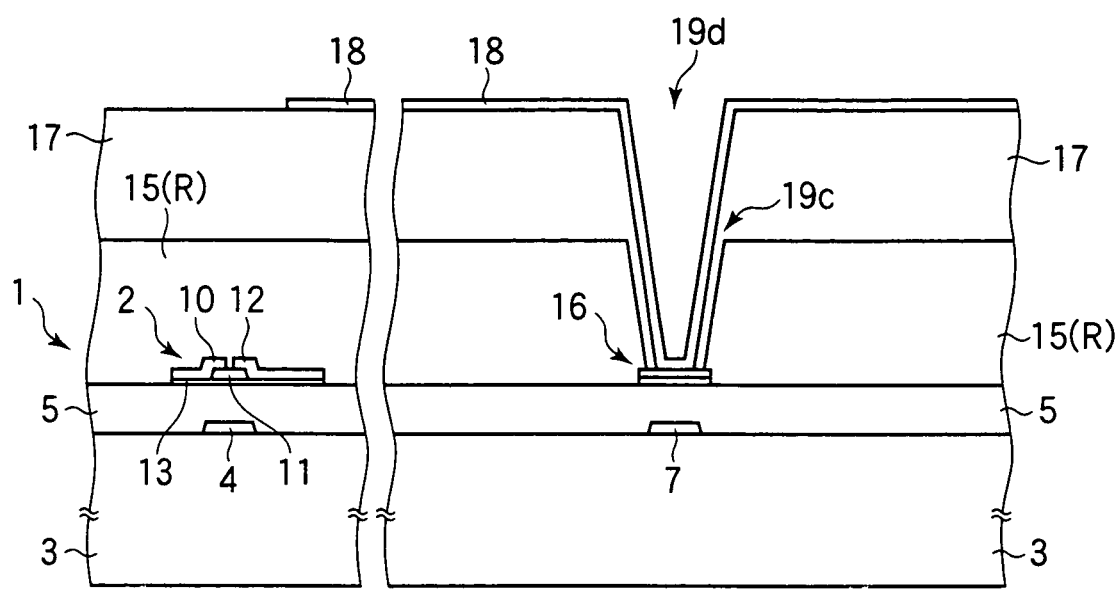
FIGS. 23A and 23B are sectional views showing the configuration of the substrate for a liquid crystal display according to Embodiment 2—2 in the second mode for carrying out the invention.

A description will now be made with reference to FIGS. 22 to 28B on a substrate for a liquid crystal display, a liquid crystal display having the same, and a method of manufacturing the same according to Embodiment 2—2. FIG. 22 shows a configuration of three pixels on a TFT substrate 1 of the present embodiment taken from above. FIGS. 23A and 23B show a section of a part of a red pixel of the TFT substrate 1. FIG. 23A shows a section of the TFT substrate 1 taken along the line A—A in FIG. 22, and FIG. 23B shows a section of the TFT substrate 1 taken along the line B—B in FIG. 22. As shown in FIG. 22, the TFT substrate 1 has a plurality of gate bus lines 4 (only one of which is shown in FIG. 22) extending on a glass substrate 3 in the horizontal direction in the figure and a plurality of drain bus lines 6 extending in the vertical direction in the figure such that they intersect with the gate bus lines 4 with an insulation film 5 interposed between them. Pixel regions are defined by the gate bus lines 4 and the drain bus lines 6. TFTs 2 are formed in the vicinity of positions where the bus lines 4 and 6 intersect with each other. As shown in FIG. 22 and FIGS. 23A and 23B, a part of a straight gate bus line 4 is used as a gate electrode 4 of a TFT 2, and an active semiconductor layer 13 is provided above the gate electrode 4 with the insulation film (gate insulation film) 5 interposed therebetween. A channel protection film 11 is formed on top of the active semiconductor layer 13 above the gate electrode 4. A drain electrode 10 and a source electrode 12 are formed on the channel protection film 11 in electrical isolation from each other. The drain electrode 10 is connected to the drain bus line 6. A storage capacitor bus line 7 is formed in parallel with the gate bus lines 4 so as to extend across each pixel region substantially in the middle thereof. The storage capacitor bus line 7 is formed from the same metal as that used for forming the gate bus lines 4. Storage capacitor electrodes 16 are formed above the storage capacitor bus line 7 with the insulation film 5 interposed therebetween. The source electrodes 12 are connected to the storage capacitor electrodes 16 by connection wirings 12a. A resin CF layer 15 is formed in each pixel region. As shown in FIGS. 23A and 23B, the resin CF layers 15 are formed also on the TFTs 2 and the drain bus lines 6. As shown in FIG. 22, the resin CF layer 15 in each pixel region is formed with a contact groove 19c which is provided above the storage capacitor bus line 7 and along the storage capacitor bus line 7 and which reaches the storage capacitor electrode 16. The resin CF layer 15 in each pixel region is divided by the contact groove 19c into two areas. Bottom sections of the contact grooves 19c formed in the resin CF layers 15 above the storage capacitor electrodes 16 are formed in the form of a straight line having a width of 10 μm and extending across the pixels along the storage capacitor bus line 7 when viewed in a direction perpendicular to the surface of the TFT substrate 1 as shown in FIG. 22.

An OC layer 17 is formed using a positive photosensitive resin on the resin CF layers 15 having the contact grooves 19c formed therein. Pixel electrodes 18 are formed on the OC layer 17. The pixel electrodes 18 are connected to the storage capacitor electrodes 16 through contact holes 19d which are formed through the OC layer 17 in the regions of the resin CF layers 15 where the contact grooves 19c are formed. The contact holes 19d have a bottom contour in the form of a circle having an inner diameter of about 8 μm.

In the configuration of the present embodiment, since the source electrodes 12 are connected to the storage capacitor electrodes 16 through the connection wirings 12a, connection to the pixel electrode 18 can be established only by the contact holes 19d. Further, the contact grooves 19c are formed within the width of the storage capacitor bus line 7, and the contact holes 19d are formed inside the contact grooves 19c. Since this eliminates a need for providing extra regions for connection at the bottom openings of the contact grooves 19c and the contact holes 19d, it is possible to achieve an improved pixel aperture ratio compared to the related art.

Figures 24A, 24B:
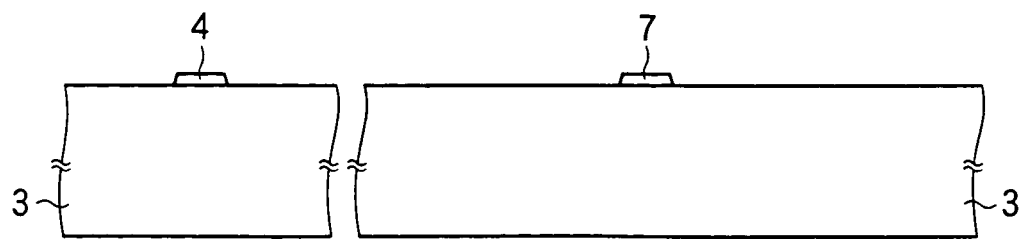
FIGS. 24A and 24B are sectional views taken in processes showing a method of manufacturing the substrate for a liquid crystal display according to Embodiment 2—2 in the second mode for carrying out the invention.

A description will now be made with reference to sectional views taken at manufacturing steps shown in FIGS. 23A to 28B on a method of manufacturing the substrate for a liquid crystal display according to the present embodiment. In FIGS. 23A to 28B, the figures indicated by the suffix A show a section of a TFT substrate 1 taken along the line A—A shown in FIG. 22, and the figures indicated by the suffix B show a section of the TFT substrate 1 taken along the line B—B shown in FIG. 22. First, as shown in FIGS. 24A and 24B, an aluminum (Al) layer having a thickness of, for example, 100 nm and a titanium (Ti) layer having a thickness of 50 nm are formed in the order listed on an entire top surface of a glass substrate 3 and are patterned to form gate bus lines 4 and storage capacitor bus lines 7.

Figures 25A, 25B:
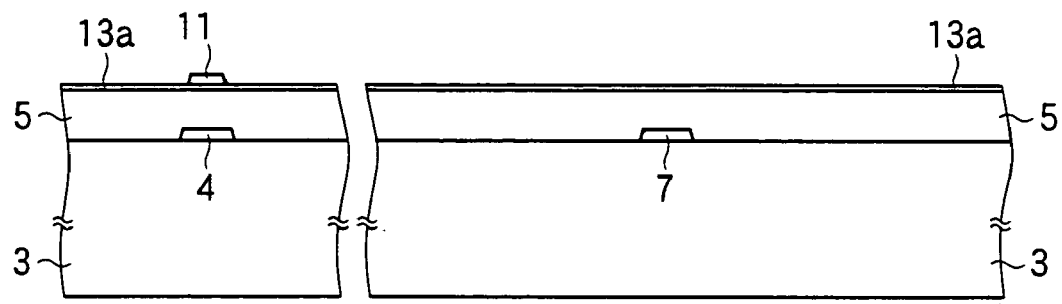
FIGS. 25A and 25B are sectional views taken in processes showing the method of manufacturing the substrate for a liquid crystal display according to Embodiment 2—2 in the second mode for carrying out the invention.

For example, a silicon nitride film (SiN film) 5 having a thickness of 350 nm, an a-Si film 13a having a thickness of 30 nm, and another SiN film having a thickness of 120 nm are then continuously formed. Next, a resist layer is formed throughout the surface, and back exposure is performed using the gate bus lines 4 as a mask. Further, exposure is performed in a forward direction using a mask to pattern the resist layer. The SiN film is etched using the patterned resist layer as an etching mask to form channel protection films 11 as shown in FIG. 25A.

Figures 26A, 26B:
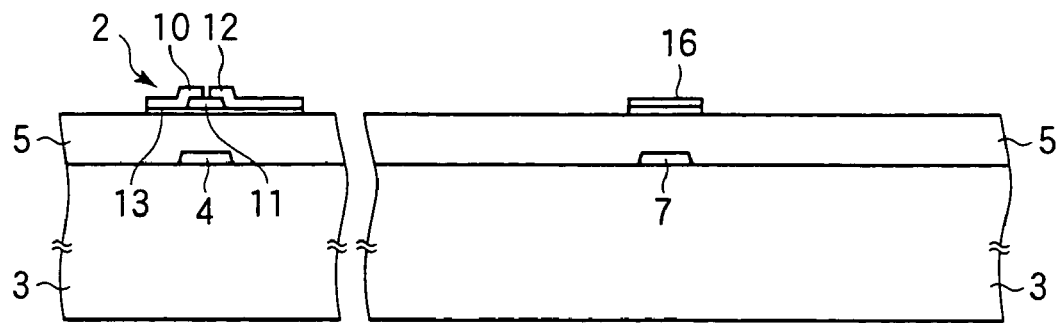
FIGS. 26A and 26B are sectional views taken in processes showing the method of manufacturing the substrate for a liquid crystal display according to Embodiment 2—2 in the second mode for carrying out the invention.

Then, for example, an n$^+$-type a-Si layer having a thickness of 30 nm, a Ti layer having a thickness of 20 nm, an Al layer having a thickness of 75 nm, and another Ti layer having a thickness of 40 nm are formed in the order listed as shown in FIGS. 26A and 26B. Patterning is performed using the channel protection films 11 as an etching stopper to form drain electrodes 10, source electrodes 12, drain bus lines 6 (not shown in FIGS. 26A and 26B) and storage capacitor electrodes 16. At the same time, connection wirings 12a (not shown in FIGS. 26A and 26B) for connecting the source electrodes 12 and the storage capacitor electrodes 16 are formed. TFTs 2 are completed through the above described steps.

Next, a red resist of a type including a negative photosensitive pigment dispersed therein is applied to a thickness of 1.8 μm, for example. Next, the substrate 3 is set in a proximity exposure apparatus, and a photo-mask for red pixels is provided close to the surface of the substrate 3 with a gap of, for example, about 100 μm left between them to perform exposure with an exposure energy of about 100 mj. On the photo-mask for red pixels, patterns are drawn which serve as light shields for regions of the surface of the substrate 3 other than red pixel regions and for areas in the red pixel regions where contact grooves 19c are to be formed. While the light-blocking patterns for forming the contact grooves 19c drawn on the photo-mask for red pixels are substantially similar to the contours of the bottoms of the contact grooves 19c to be formed, the patterns are formed greater than the contours by a predetermined offset amount taking diffraction of light into consideration. The width of the bottoms of the contact grooves 19c is 10 μm. Since the width of the light-blocking patterns for forming the contact grooves 19c formed on the photo-mask is about 18 μm which is shorter than 28 μm that is the length of one side of a light-blocking pattern according to the related art, there is a possibility that diffracted exposure light enters the color resist layer in the areas for forming the contact grooves 19c in the direction of the width of the light-blocking patterns. On the contrary, diffracted exposure light will not enter in the lengthwise direction of the light-blocking patterns at all. Therefore, by adjusting the intensity of exposure, the color resist layer in the areas for forming the contact grooves 19c can be formed with unexposed regions in a direction perpendicular to the surface of the substrate 3. After the exposure, development is performed, and unexposed regions of the resist layer are dissolved and removed. After cleaning, a post-baking process is performed for 40 minutes at 230° C. to form resin CF layers 15 (R) having contact grooves 19c formed to expose the storage capacitor electrodes 16 in the red pixel regions, as shown in FIG. 27B. The contact grooves 19c thus formed are in the form of stripes which are 10 μm wide at the bottom section thereof extending across the pixel regions. The contact grooves 19c are formed with a width at an open end thereof that is one size greater than the with of the bottom section and are formed in a tapered configuration in which the grooves become narrower, the deeper they become.

Similarly, a blue resist of the type including a negative photosensitive pigment dispersed therein is applied to a thickness of 1.8 μm, for example. The substrate 3 is set in the proximity exposure apparatus, and a photo-mask for blue pixels is provided close to the surface of the substrate 3 to perform exposure. On the photo-mask for blue pixels, patterns are drawn which serve as light shields for regions of the surface of the substrate 3 other than blue pixel regions and for areas in the blue pixel regions where contact grooves 19c are to be formed. While the light-blocking patterns for forming the contact grooves 19c drawn on the photo-mask for blue pixels are substantially similar to the width of the bottoms of the contact grooves 19c to be formed, the patterns are formed greater than the width by a predetermined offset amount. After the exposure, development is performed, and a post-baking process is performed to form resin CF layers 15 (B) having contact grooves 19c formed above the storage capacitor electrodes 16 in the blue pixel regions.

Similarly, a green resist of the type including a negative photosensitive pigment dispersed therein is applied to a thickness of 1.8 μm, for example. The substrate 3 is set in the proximity exposure apparatus, and a photo-mask for green pixels is provided close to the surface of the substrate 3 to perform exposure. On the photo-mask for green pixels, patterns are drawn which serve as light shields for regions of the surface of the substrate 3 other than green pixel regions and for areas in the green pixel regions where contact grooves 19c are to be formed. While the light-blocking patterns for forming the contact grooves 19c drawn on the photo-mask for green pixels are substantially similar to the contours of the bottoms of the contact grooves 19c to be formed, the patterns are formed greater than the same by a predetermined offset amount. After the exposure, development is performed, and a post-baking process is performed to form resin CF layers 15 (G) having contact grooves 19c formed above the storage capacitor electrodes 16 in the green pixel regions.

Next, a positive photosensitive resin is applied to a thickness of about 2.0 μm throughout the substrate after the formation of the resin CF layers 15. The resin is subjected to proximity exposure using a photo-mask having a pattern for forming contact holes 19d drawn thereon and is developed to form an OC layer 17. As shown in FIGS. 28A and 28B, the OC layer 17 is formed with contact holes 19d which are in alignment with the contact grooves 19c formed in the resin CF layers 15. Since a positive photosensitive resin is used, contact holes 19d with a bottom contour in the form of a circle having an inner diameter of about 8 μm can be reliably formed even when a proximity exposure apparatus is used.

Next, an ITO film having a thickness of, for example, 70 nm is formed throughout the substrate and is patterned to form pixel electrodes 18 which are in contact with the top surface of the resin CF layers 15 in the pixel regions, inner walls of the contact holes 19d penetrating through the resin CF layers 15 and the storage capacitor electrodes 16 exposed at the bottom of the contact holes 19d, as shown in FIGS. 23A and 23B.

As described above, in the present mode for carrying out the invention, the contact grooves 19c formed in the resin CF layers 15 are provided with a bottom contour that extends across the pixel regions along the storage capacitor bus line 7, which makes it possible to provide a CF-on-TFT structure having an improved pixel aperture ratio at a low cost using a proximity exposure apparatus.

Although the resin CF layers 15 (R, G and B) are formed directly on a source/drain forming layer in which the drain electrodes 10, the source electrodes 12 and the drain bus lines 6 are provided in the present embodiment, a protective film may alternatively be formed on the source/drain forming layer, and the resin CF layers 15 (R, G and B) may be formed on the protective film. A protective film may be formed on the resin CF layers 15 (R, G and B), and the pixel electrodes 18 may be formed on the protective film. Obviously, the TFTs 2 and the resin CF layers 15 (R, G and B) may be formed using materials and manufacturing steps other than those described above.

Although the CF resist layer is formed directly on the drain metal forming layer in the present embodiment, the CF resist layer may obviously be formed after forming a passivation film on the drain metal forming layer. Further, although the OC layer is formed on the CF resin in the present embodiment, the pixel electrodes 18 may be formed directly on the resin CF layers without providing the OC layer.

Embodiment 2-3

Figure 29:
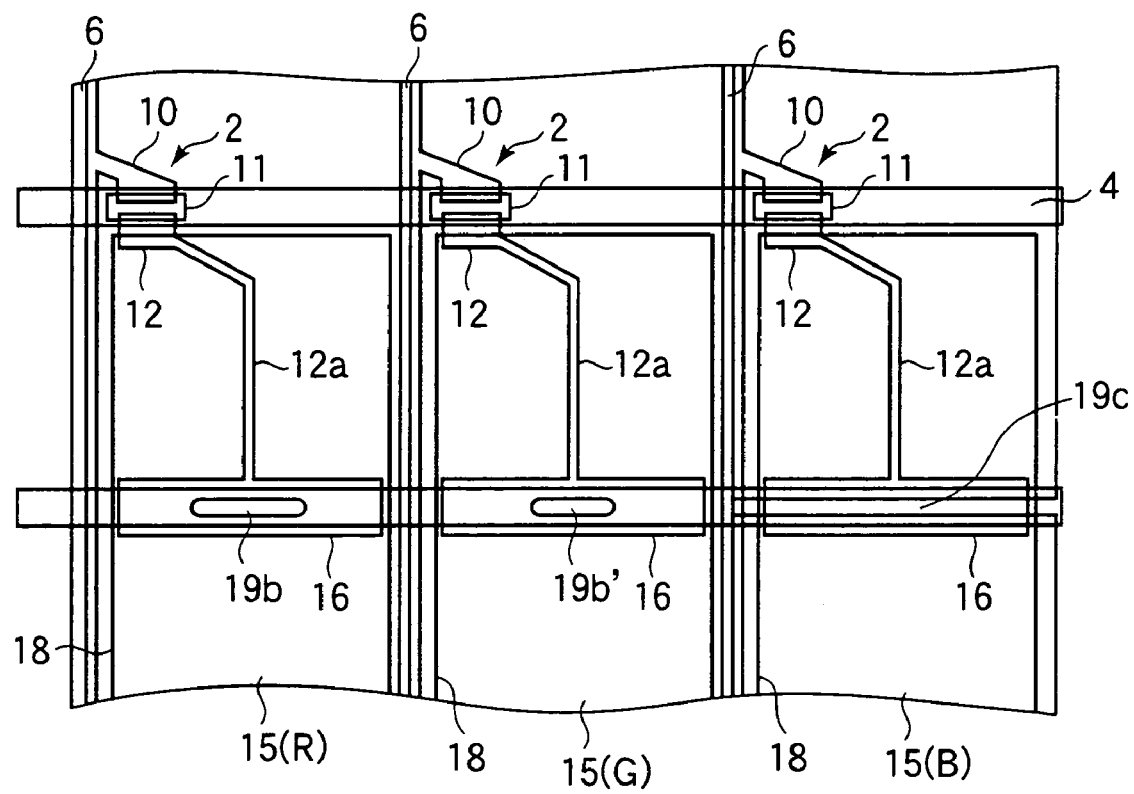
FIG. 29 shows a configuration of a substrate for a liquid crystal display according to Embodiment 2-3 in the second mode for carrying out the invention.

A substrate for a liquid crystal display according to Embodiment 2-3 will now be described with reference to FIG. 29. FIG. 29 shows a configuration of three pixels on a TFT substrate 1 of the present embodiment taken from above. The substrate for a liquid crystal display of the present embodiment has a structure in which source electrodes 12 and storage capacitor electrodes 16 are connected by connecting wirings 12a just as in Embodiment 2—2. The OC layer used in Embodiment 2—2 is not formed on the substrate for a liquid crystal display of the present embodiment, and the substrate is therefore manufactured using substantially the same manufacturing method as that in Embodiment 2-1.

The configuration shown in FIG. 29 is characterized in that contact holes for connecting storage capacitor electrodes 16 and pixel electrodes 18 formed in pixel regions have contours at the bottom thereof which are different from each other in configuration and area. Specifically, a contact hole 19b formed in a red pixel region has a bottom contour in the same configuration and dimensions as those shown in Embodiment 2-1. On the contrary, a contact hole 19b' formed in a green pixel region is formed with a major axis shorter than that of the contact hole 19b, and the opening area of the bottom contour of the hole 19b' is therefore formed smaller than that of the contact hole 19b. A contact groove 19c as shown in Embodiment 2—2 is formed in a blue pixel region instead of a contact hole.

By varying the configuration of the bottom contour and opening area of the contact holes (including contact grooves) for each color, a minimum required bottom opening area can be provided for each of color resists from which resin CF layers 15 (R, G and B) are formed in accordance with differences between resolutions of those resists. In the present embodiment, a contact groove 19c is formed in a blue (B) color resist layer which has the lowest resolution in general, in order to ensure that a bottom opening is provided for the same. In a green (G) color resist layer having a high resolution, a contact hole 19b' is formed to minimize the area of the metal layer exposed to the opening at the bottom of the contact hole. This makes it possible to minimize the quantity of reflection of light that has entered from a display panel side of a liquid crystal display, thereby improving display quality.

In stead of uniformly varying the configuration of the bottom contour and opening area of contact holes or contact grooves for each color, changes may obviously be made to optimize the configuration of the bottom contour and opening area of each of contact holes or contact grooves which are formed in various positions on the glass substrate 3 depending on differences between the resolutions of the respective resist layers.

As described above, according to the present mode for carrying out the invention, in a substrate for a liquid crystal display having color filters formed on a TFT substrate, holes formed on CF layers for providing electrical contact between upper and lower electrodes (source electrodes and pixel electrodes) sandwiching the CF layers are formed in configurations having longitudinal and transverse lengths different from each other. This makes it possible to improve luminance by achieving a high aperture ratio and to improve the resolutions of the CF layers while minimizing loss of the pixel aperture ratio even using an ordinary CF forming apparatus or process such as a proximity exposure apparatus. It is therefore possible to simplify process designing and to perform a stable process.

Further, by varying the size of holes or grooves for contact for each of R, G and B, it is possible to cope with differences between resolutions of CF resists depending on the colors of the same and to suppress any increase in the reflectivity of the panel at the time of display attributable to a too great metal area uncovered by a color filter. A liquid crystal display having high quality can be thus provided. The same advantages can be achieved by varying the size of holes or grooves for contact in a panel in accordance with the characteristics of the process used to form the panel.

What is claimed is:

1. A substrate for a liquid crystal display, comprising:
   a switching element formed in a pixel region;
   a resin color filter layer formed in the pixel region;
   a pixel electrode formed on the resin color filter layer; and
   a contact hole formed through the resin color filter layer to electrically connect the switching element and the pixel electrode, and the contour of the bottom of the contact hole having different length in longitudinal and transverse directions thereof and having round corners.

2. A substrate for a liquid crystal display according to claim 1, wherein the ratio between a major axis and a minor axis of the contour of the bottom (ratio between major and minor axial lengths=minor axial length/major axial length) is 0.5 or less.

3. A substrate for a liquid crystal display according to claim 1, wherein the area inside the contour of the bottom is 600 mm2 or less.

4. A substrate for a liquid crystal display according to claim 1, wherein an opening area inside the contour of the bottom varies depending on the position where the resin color filter layer is provided.

5. A substrate for a liquid crystal display according to claim 1, wherein the opening area inside the contour of the bottom is different for each color of the resin color filter layer.

6. A substrate for a liquid crystal display according to claim 1, wherein the resin color filter layer is formed from a negative type photosensitive material.

7. A liquid crystal display comprising:
   a base substrate having a pixel electrode formed in each pixel region, a switching element for driving the pixel electrode, and a color filter layer formed between the switching element and the pixel electrode;
   an opposite substrate provided opposite to the base substrate; and
   a liquid crystal layer sandwiched between the base substrate and the opposite substrate, wherein a substrate for a liquid crystal display according to claim 1 is used as the base substrate.

* * * * *

UNITED STATES PATENT AND TRADEMARK OFFICE
CERTIFICATE OF CORRECTION

PATENT NO. : 7,012,658 B2 Page 1 of 1
APPLICATION NO. : 10/767226
DATED : March 14, 2006
INVENTOR(S) : Manabu Sawasaki It is certified that error appears in the above-identified patent and that said Letters Patent is hereby corrected as shown below:

On Title Page, col. 1
    Under (30) Foreign Application Priority Data, delete "Mar. 28, 2002" and insert --March 28, 2003--.

Col. 24, line 10, delete "claim 1" and insert --claim 4--.

Signed and Sealed this

Eighteenth Day of July, 2006

JON W. DUDAS
*Director of the United States Patent and Trademark Office*